T. G. PLANT.
HEELING MACHINE.
APPLICATION FILED FEB. 19, 1909.

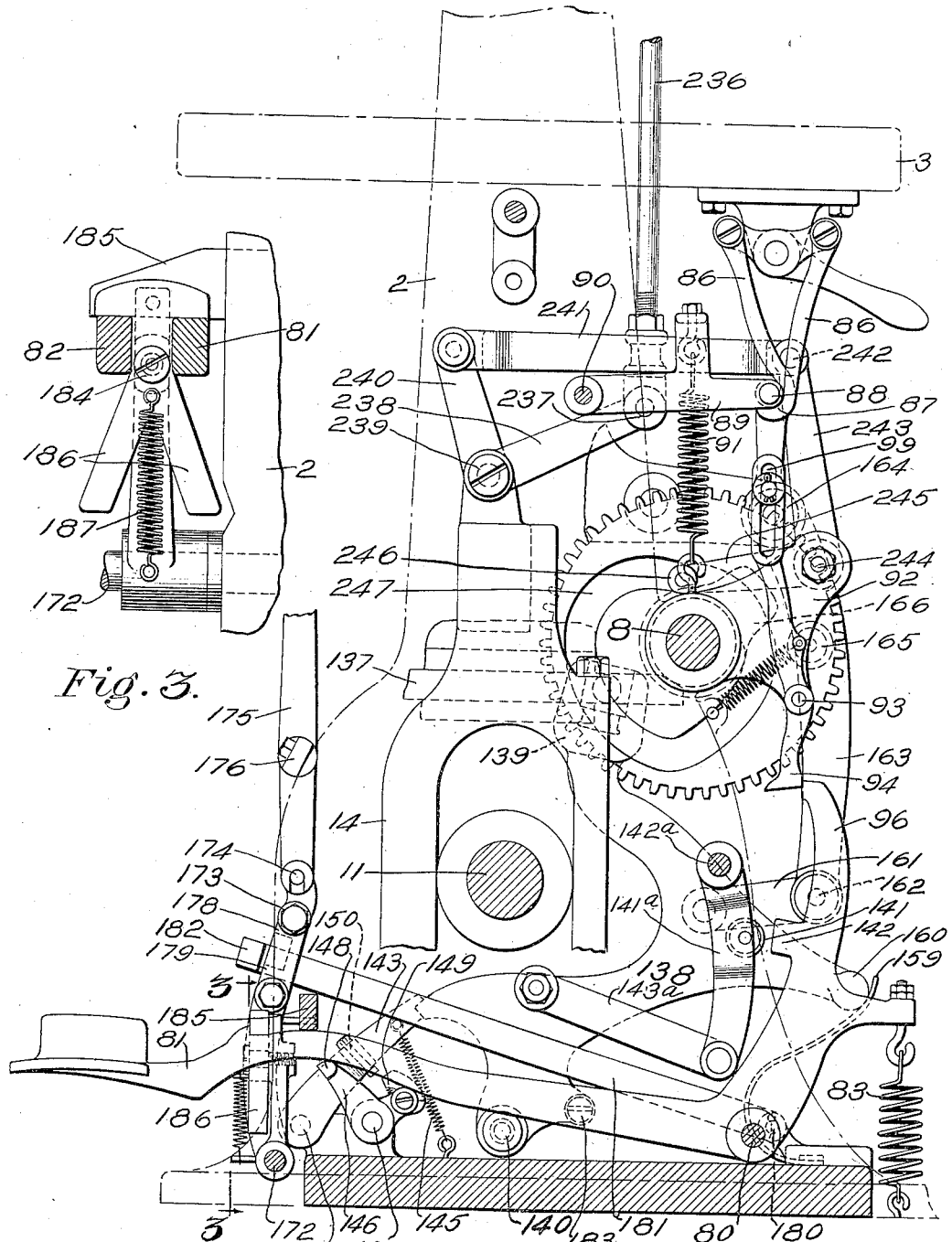

958,282.

Patented May 17, 1910.
13 SHEETS—SHEET 3.

Witnesses:
Roswell F. Hatch
Redfield H. Allen

Inventor,
Thomas G. Plant
by Robt. P. Hawes
Atty.

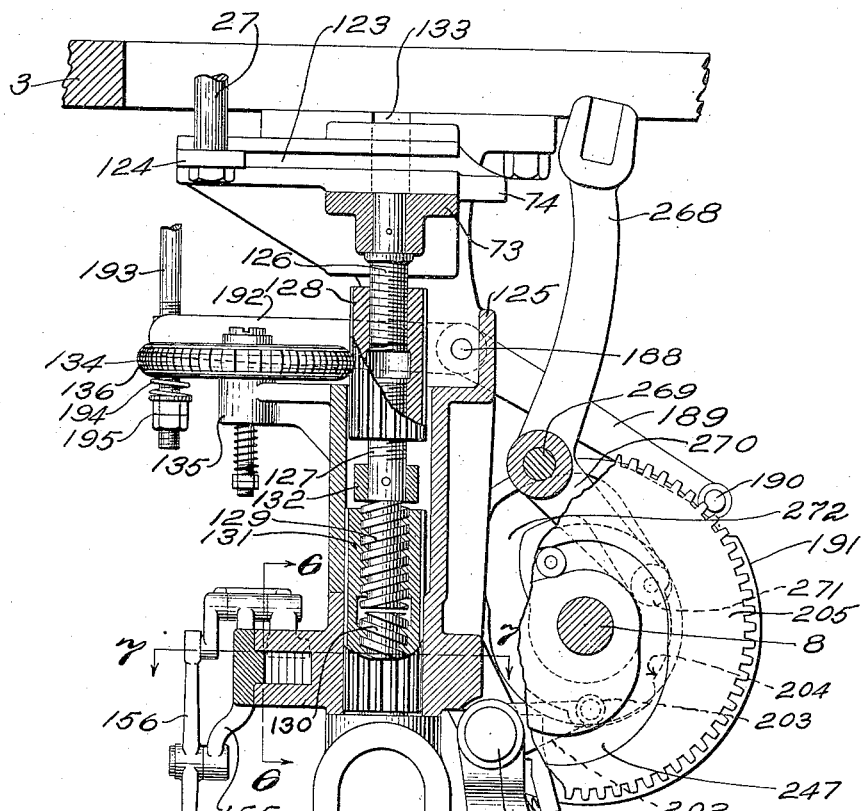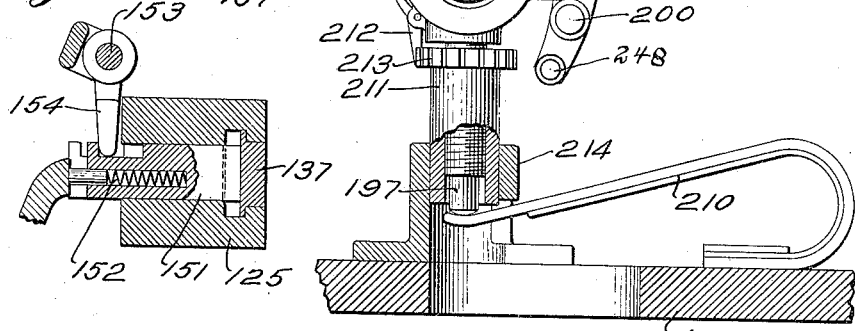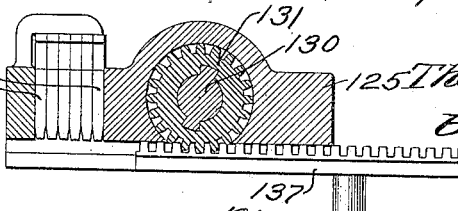

T. G. PLANT.
HEELING MACHINE.
APPLICATION FILED FEB. 19, 1909.
958,282.
Patented May 17, 1910.
13 SHEETS—SHEET 13.
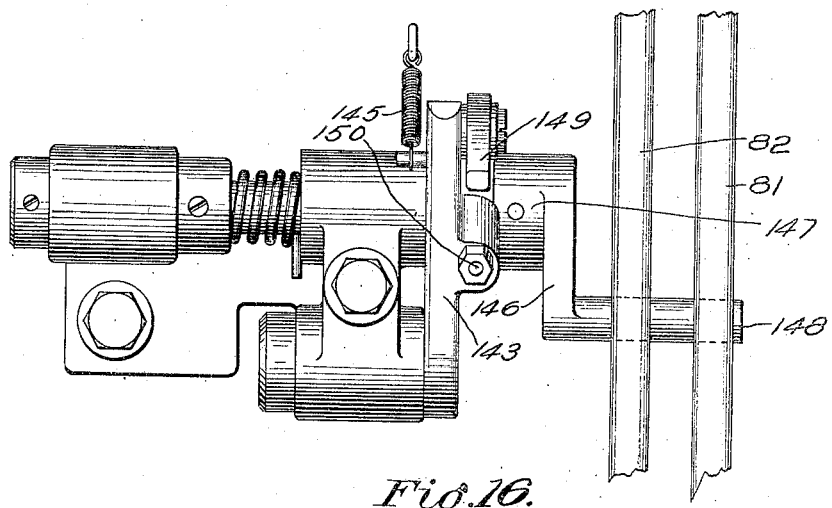
Fig. 16.
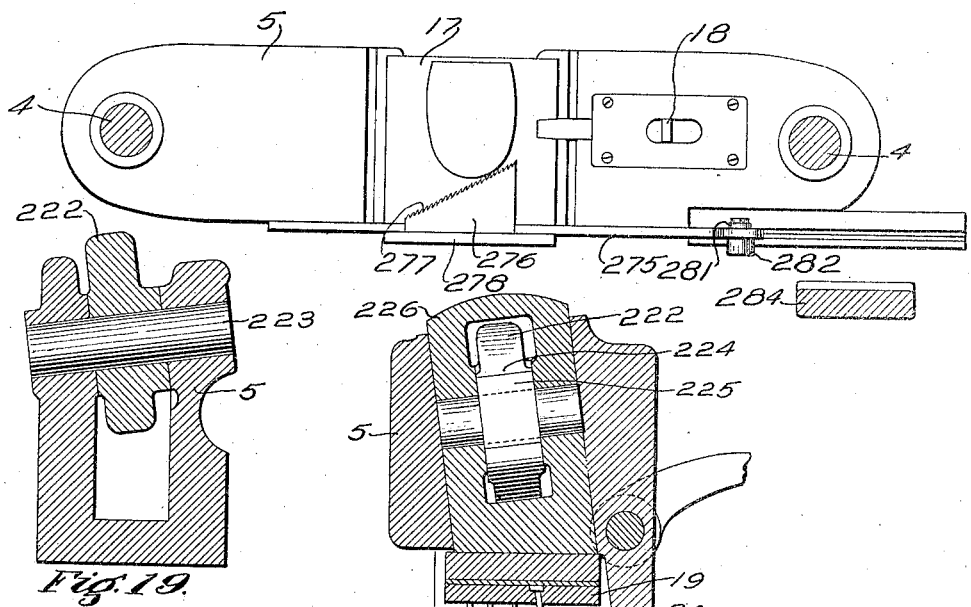
Fig. 17.
Fig. 19.
Fig. 18.
Witnesses
Roswell F. Hatch
Redfield H. Allen
Inventor:
Thomas G. Plant
by Robt. T. Harris,
Att'y.

UNITED STATES PATENT OFFICE.

THOMAS G. PLANT, OF BOSTON, MASSACHUSETTS.

HEELING-MACHINE.

958,282.  Specification of Letters Patent.  Patented May 17, 1910.

Application filed February 19, 1909. Serial No. 478,954.

*To all whom it may concern:*

Be it known that I, THOMAS G. PLANT, a citizen of the United States, residing at Boston, in the county of Suffolk and State of Massachusetts, have invented an Improvement in Heeling-Machines, of which the following description, in connection with the accompanying drawings, is a specification, like numerals on the drawings representing like parts.

The invention to be hereinafter described relates to heeling machines, and more particularly to machines for attaching loaded heels to shoes and thereafter for spanking on a top lift, it being understood, of course, that the machine is not restricted in these respects and that the invention comprehends a machine adapted to operate upon shoes either before or after the last has been removed.

The aims and objects of the invention are to so improve the construction of the machines of the above general type that the heels and top lifts may be more accurately positioned and the heel present a proper appearance in connection with different styles of shoes, regardless of whether they be rights or lefts.

As will hereinafter more fully appear and be evident to those skilled in the art, other objects of the invention are to increase the rapidity of action and in general to simplify and render such machines more effective for the class of work to be done.

The various features of the invention will best be understood from the following description and accompanying drawings of one form or embodiment of means for carrying the invention into practical effect, it being understood that the invention is not circumscribed by the particular details set forth, the true scope thereof being set forth in the claims.

Figure 1:
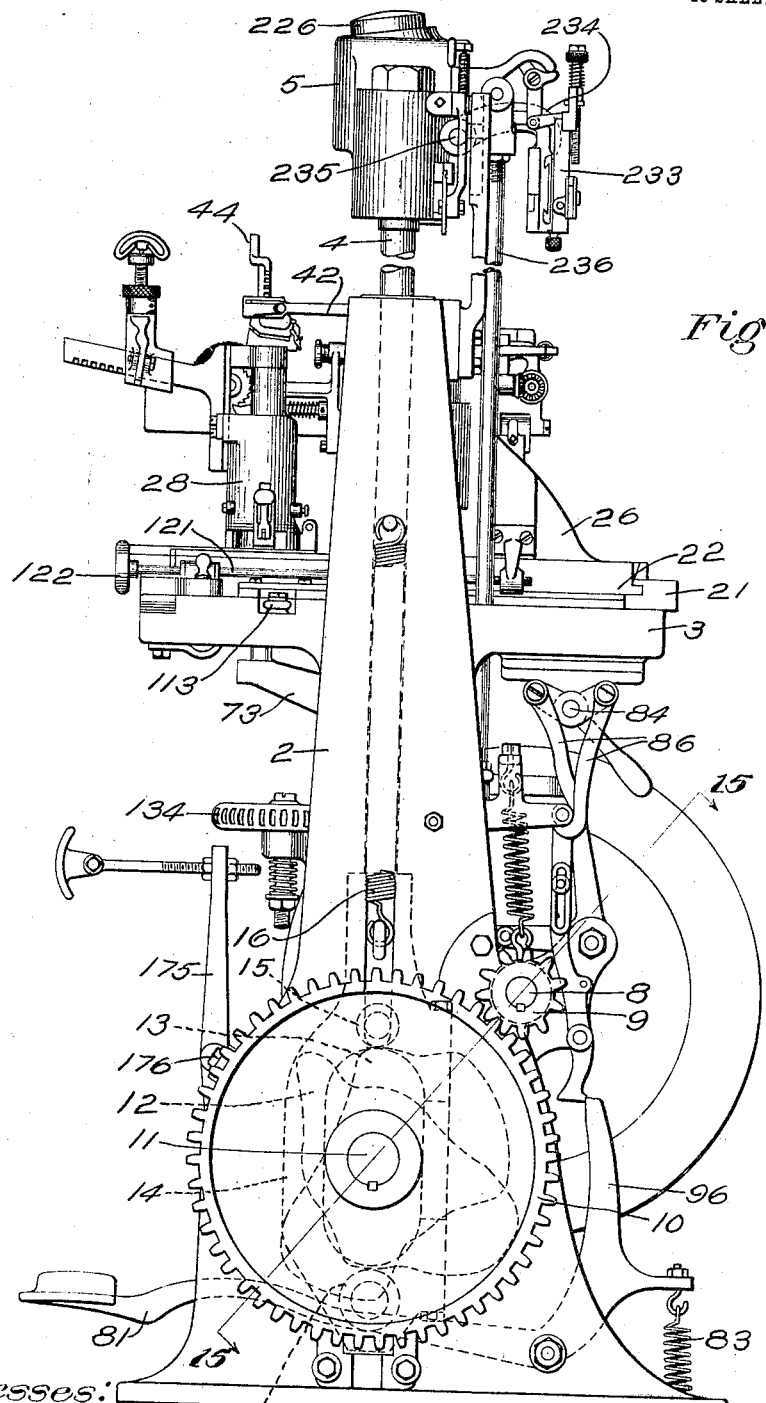
Figure 4:
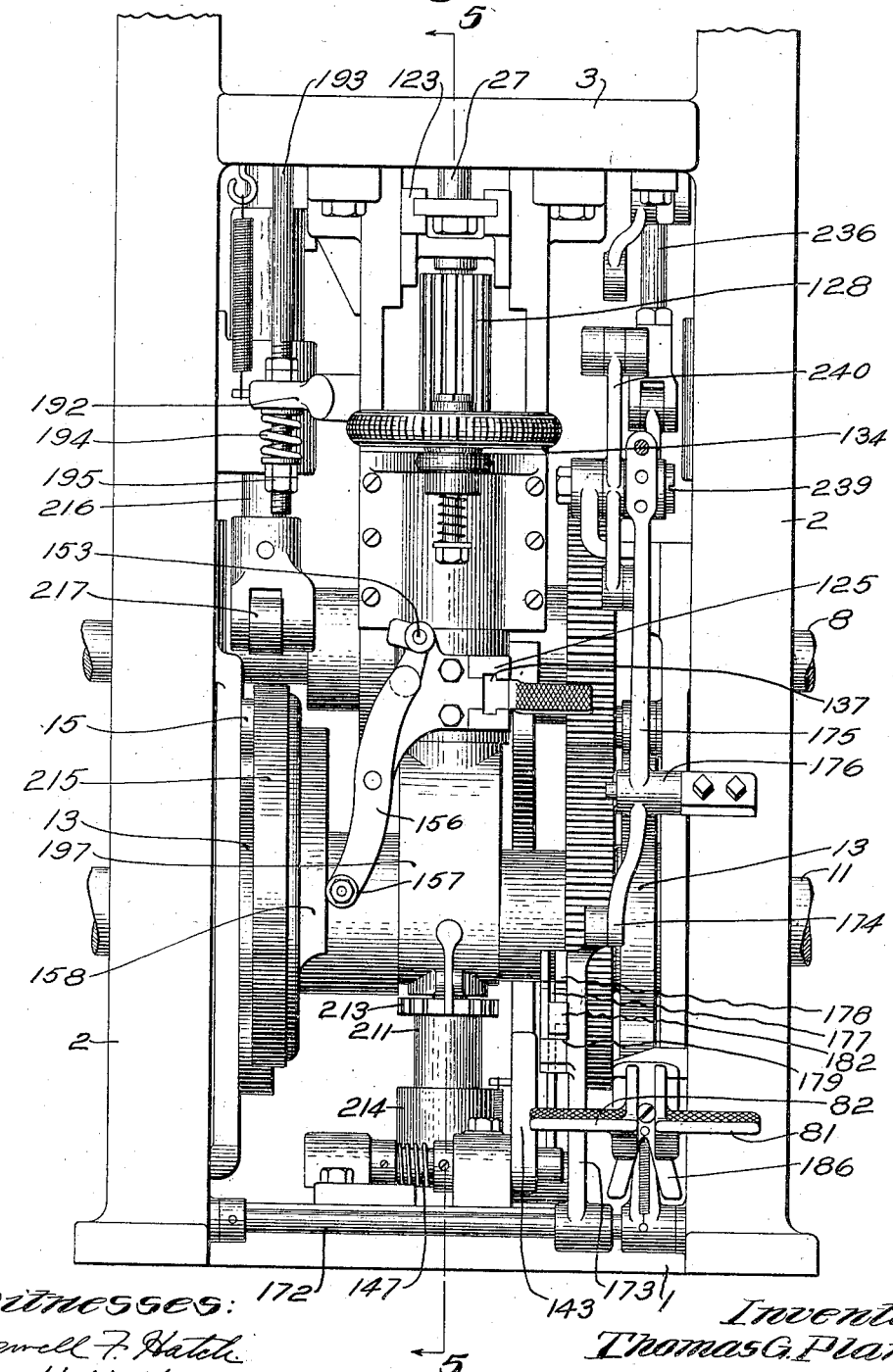
Figure 8:
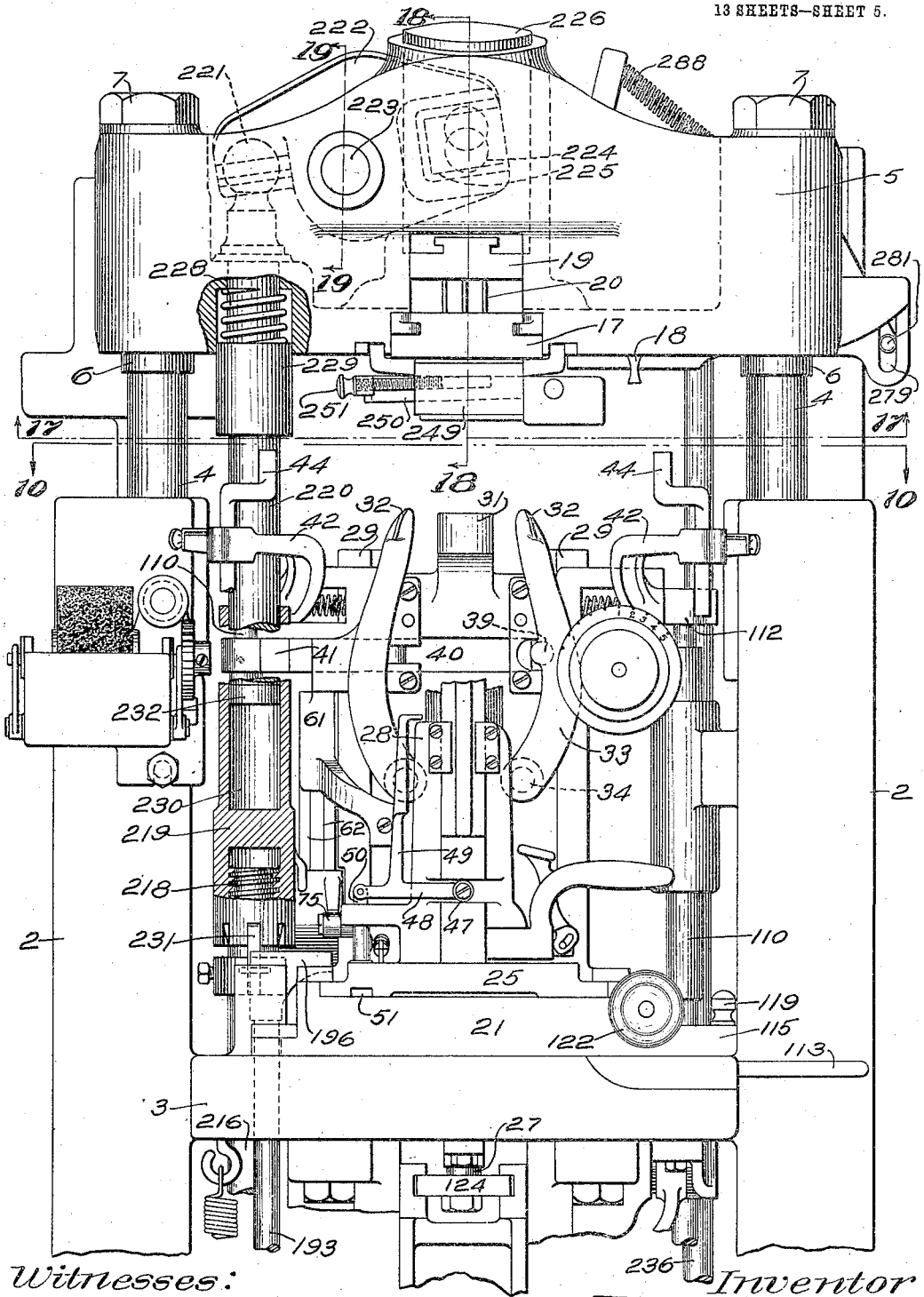
Figure 9:
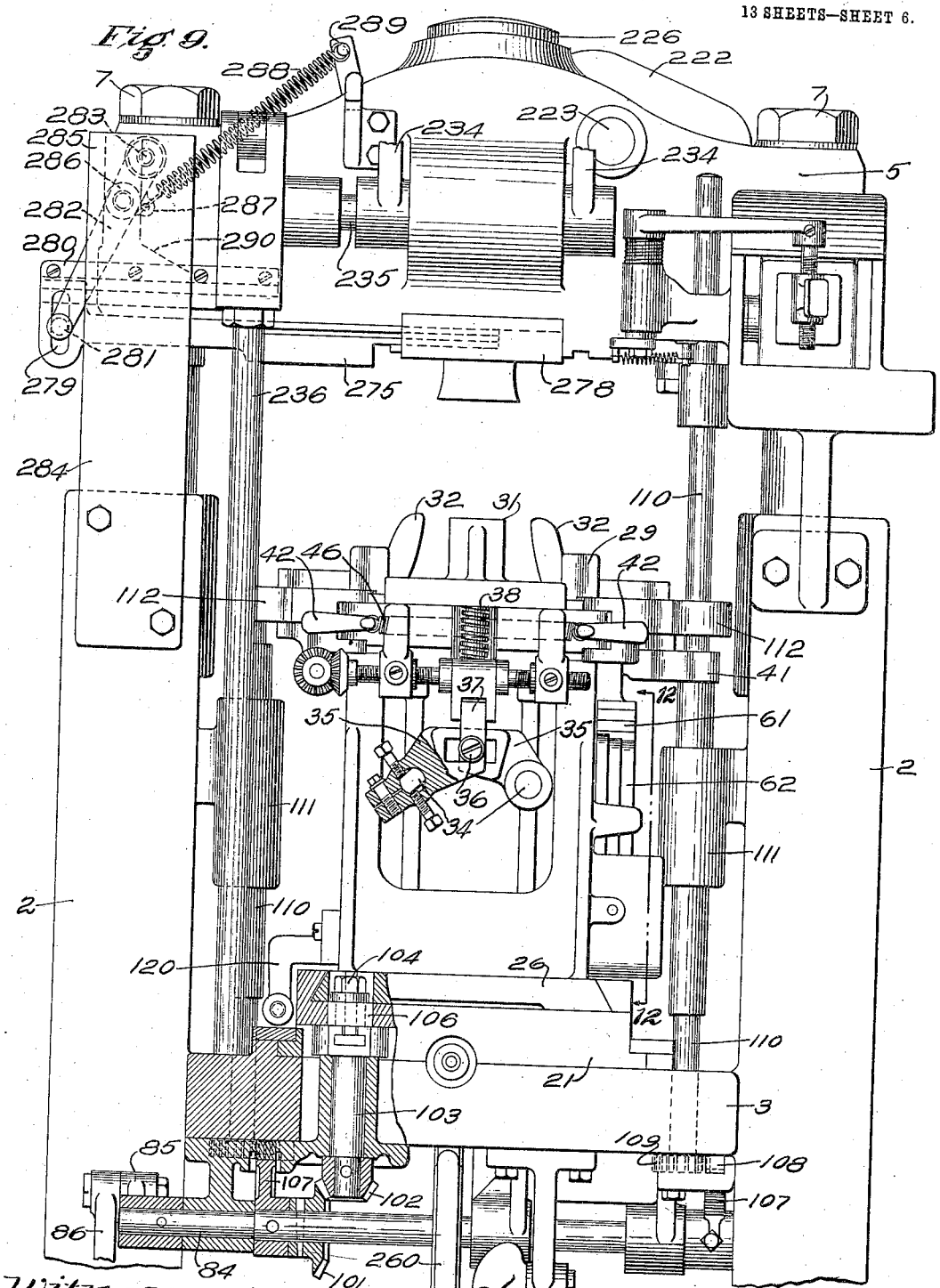
Figure 10:
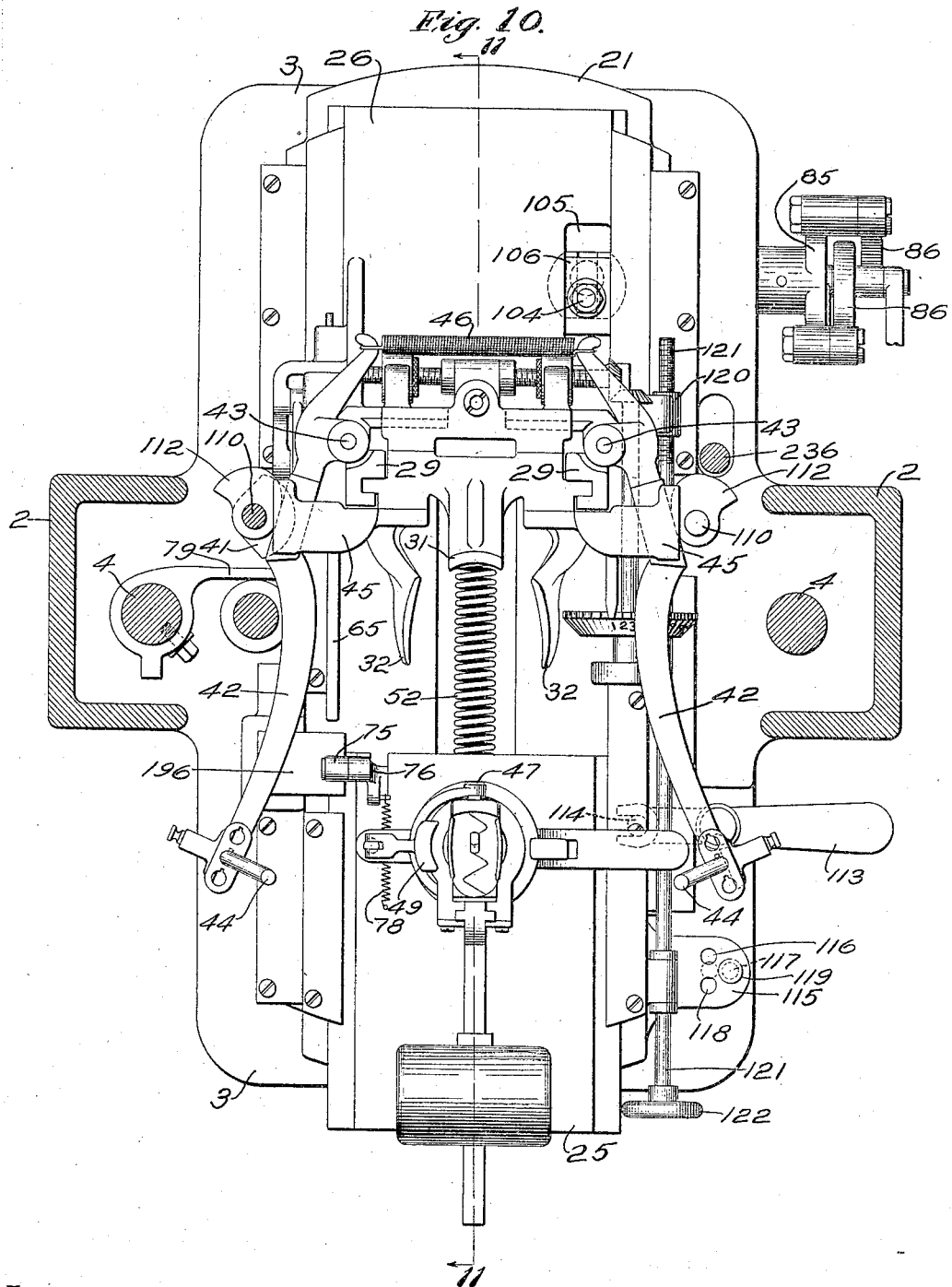
Figure 11:
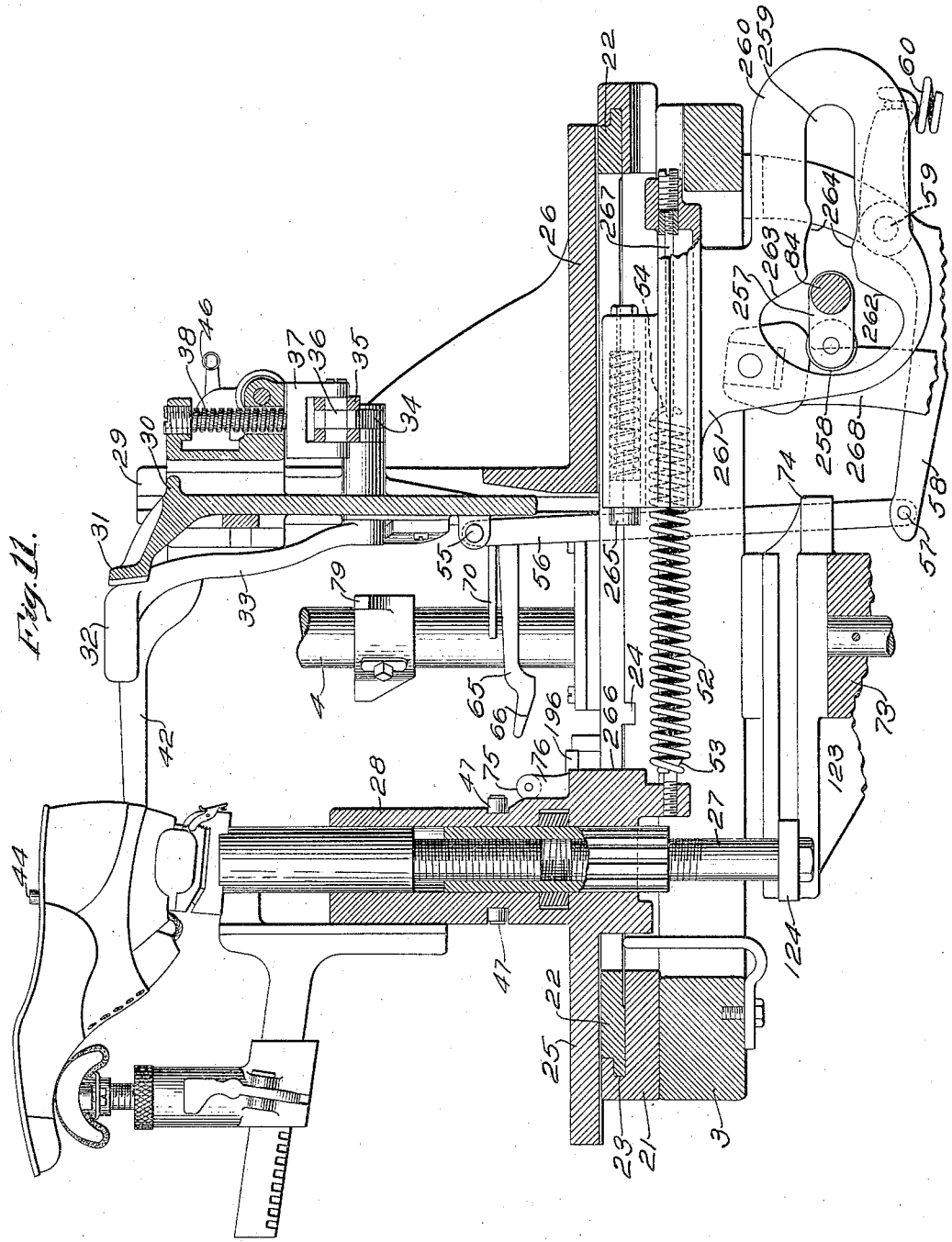
Figure 12:
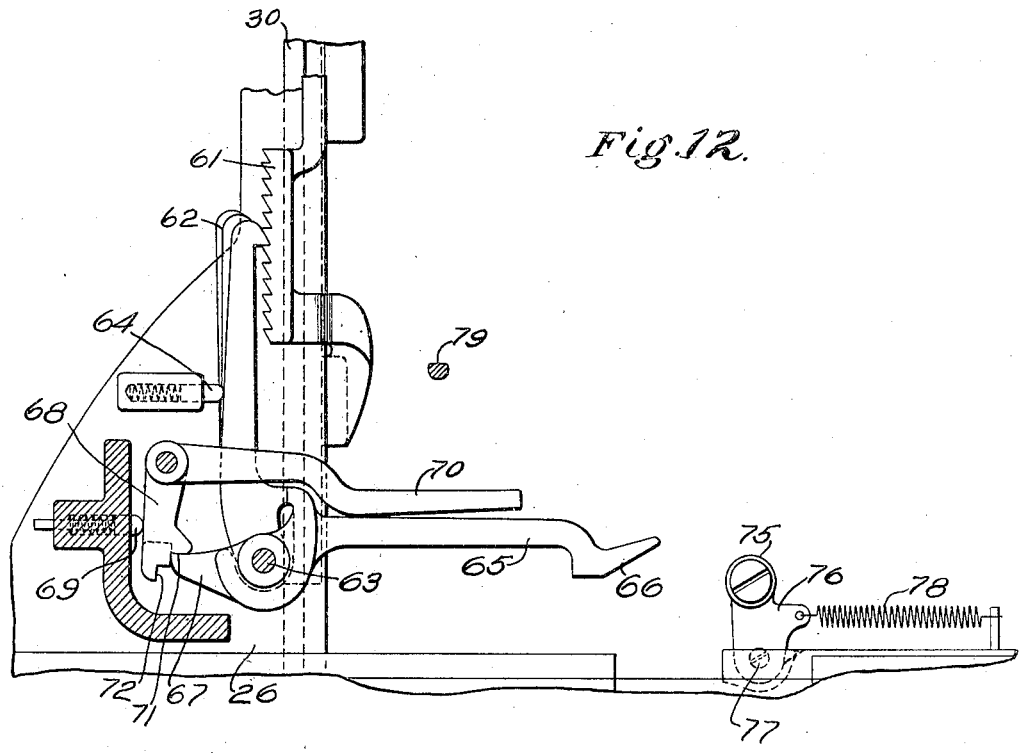
Figure 13:
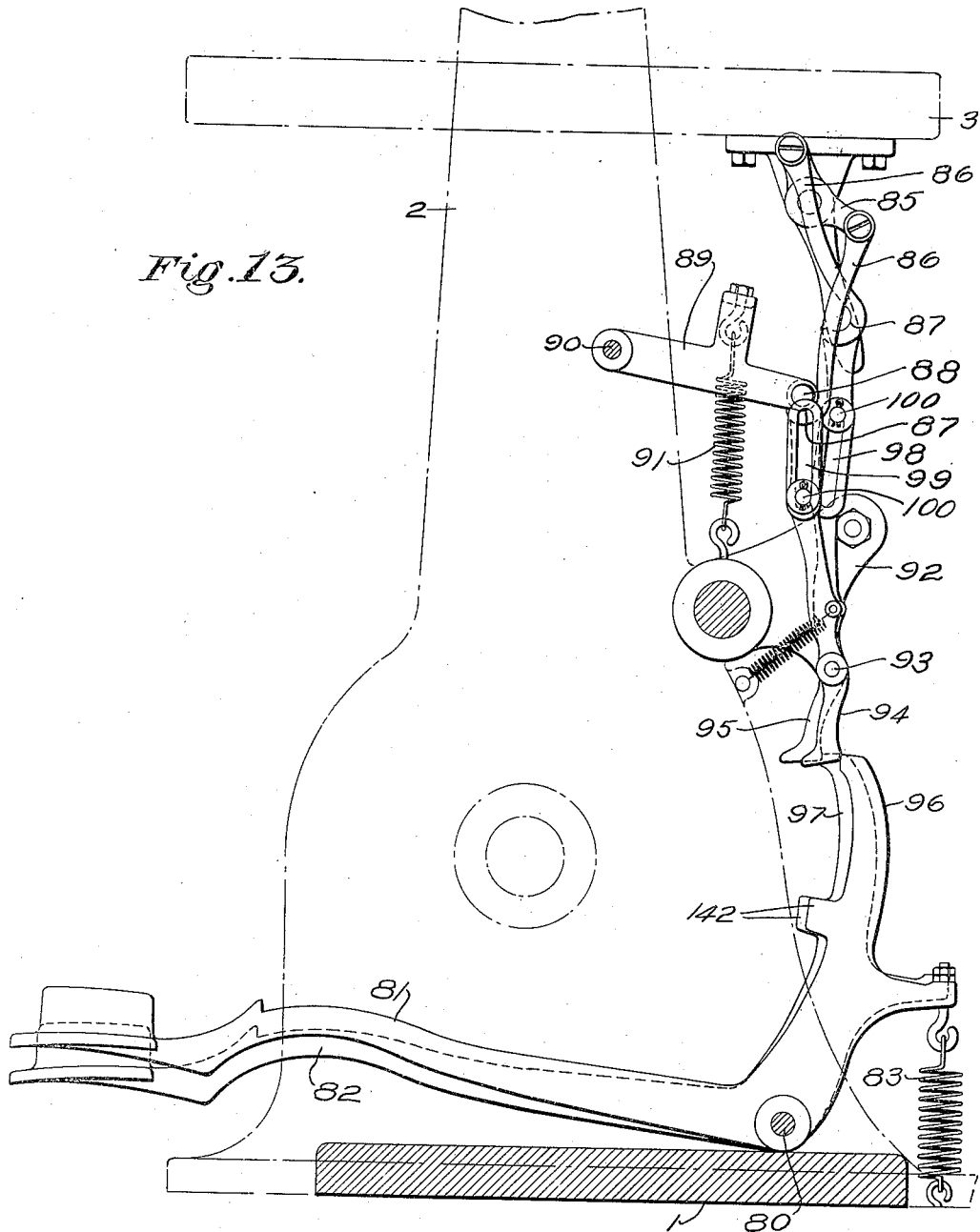
Figure 14:
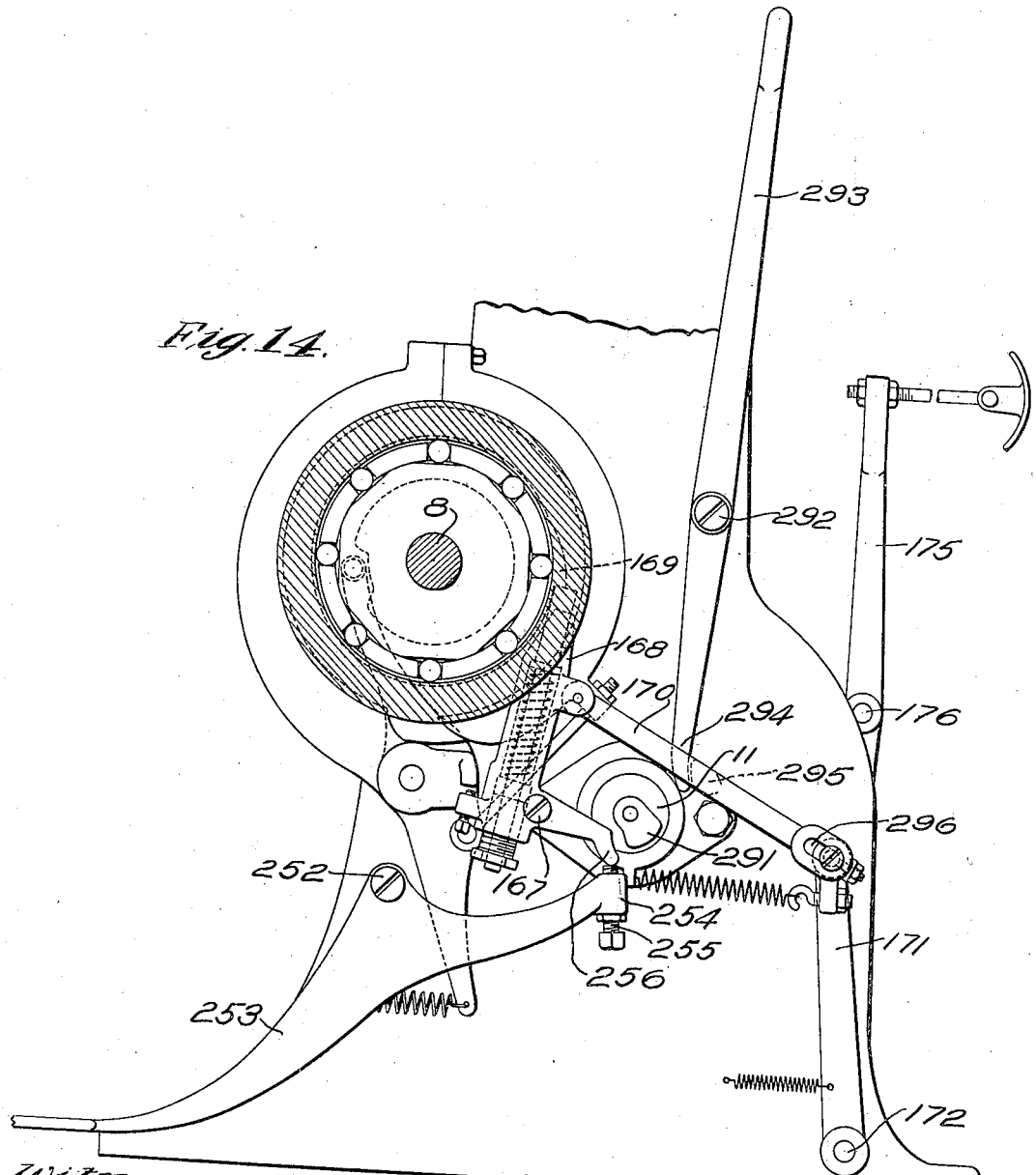
Figure 15:
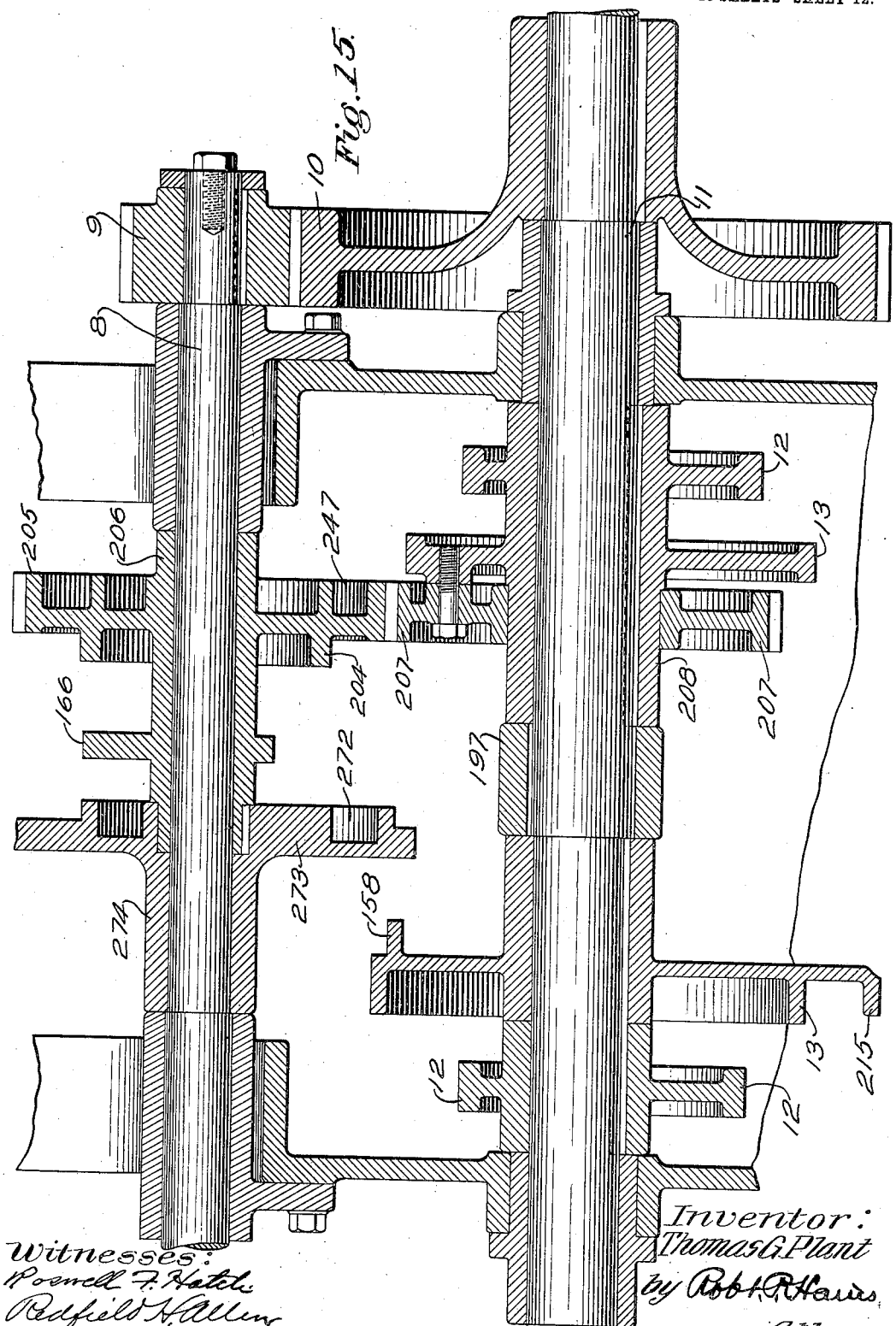

In the drawings:—Figure 1 is a general side elevation of a machine of the character referred to and embodying the features of the present invention; Fig. 2 is an enlarged side view of the lower part of the machine with the side framing or standard nearest the observer removed and showing some of the parts in section in order to make clear their association and relation; Fig. 3 is a sectional view on the line 3—3 of Fig. 2; Fig. 4 is an enlarged front elevation of the lower part of the machine; Fig. 5 is a section on the line 5—5 of Fig. 4; Fig. 6 is a detail section on the line 6—6 of Fig. 5; Fig. 7 is a sectional detail on the line 7—7, Fig. 5; Fig. 8 is an enlarged front view of the upper part of the machine, showing the relation of the cross head, nailing devices, and a shoe support, some of the parts being shown in section or broken away; Fig. 9 is an enlarged rear view similar to Fig. 8, some of the parts being shown in section and others broken away to prevent confusion; Fig. 10 is a section on the line 10—10 of Fig. 8; Fig. 11 is a section on the line 11—11 of Fig. 10, a shoe being shown supported by the shoe support; Fig. 12 is a detached detail of part of the shoe positioning means or support; Fig. 13 is an enlarged detail side elevation, parts being shown in section, of one form of means for swinging the shoe support and its associated parts for rights and lefts and different styles of shoes; Fig. 14 is an enlarged side view, with parts being shown in section, of the clutch mechanism for connecting the driving and driven elements and the safety devices connected therewith; Fig. 15 is a section on line 15—15, Fig. 1; Fig. 16 is a detached detail showing the relation of the two treadles and their adjacent parts; Fig. 17 is a section on line 17—17 of Fig. 8, looking upward; Fig. 18 is a section on line 18—18, Fig. 8, with the top lift carrier in its upward or receiving position; and Fig. 19 is a section on line 19—19, Fig. 8.

The general framework or supporting frame may be of any usual or desired type and is shown as having a base portion 1 and two side uprights 2, 2, connected intermediate the top and bottom thereof by a fixed table or support 3, and furnishing suitable guiding means, as usual, for the actuating rods 4, 4 carrying the cross head 5, to which the said rods are connected by suitable collars 6 and nuts 7.

Extending transversely between the side frames or uprights 2, 2 is the driving shaft 8, Figs. 1 and 15, carrying a gear 9 which is operatively engaged with a gear 10 fast on the counter-shaft 11, also extending between the said frames, such gearing connection being as four to one, so that the counter-shaft 11 will be driven one complete rotation for four rotations of the driving shaft 8.

Secured to the counter-shaft 11 are the pairs of cams 12 and 13, one pair adjacent each side of the machine frame, for reciprocating the rods 4 and consequently moving the cross head vertically. The connection between the rods 4 and the cams 12 and 13 may be made in any suitable manner, and, as indicated in Fig. 1, such driving connection is formed by means of a yoke 14 connected to the said rods and carrying the rolls 15 adapted to contact with the peripheries of the cams, a spring or springs 16 being provided, if desired, to assist in counterbalancing the cross head.

Preferably the cams 12 and 13 are designed to the end that two complete reciprocations are given the cross head for each complete rotation of the counter-shaft 11, one reciprocation of the cross head being used for attaching the heel and the second reciprocation for spanking on a top lift to the previously attached heel.

The cross head 5 is preferably provided with a removable nailing block 17, Figs. 8 and 17, held in place by means of a latch having a finger piece 18, Fig. 17, projecting from the cross head, the construction being such that, upon withdrawal of the latch, the nailing block may be drawn outward from the cross head and another replaced in accordance with the character or design of nails in the heel.

Mounted on the cross head above the nail block is a driver block 19, Fig. 8, having mounted thereon a series of drivers 20, one of such drivers for each hole in the nail block, as usual. In the operation of the machine, as hereinafter described, the drivers are moved downwardly into the nail block through a stroke sufficient to bring their lower ends at a distance from the top of the heel to permit the head ends of the nails to project a short distance above the heel. These projecting nail heads are used, as will be hereinafter described, in securing a top lift to the heel. In the further operation of the machine, a top lift carrier, Fig. 1, is brought to a position beneath the nail block and places the top lift carried thereby in proper position to be spanked onto the heel on the downward movement of the cross head 5. This characteristic of the machine will hereinafter more fully appear.

The stationary cross piece or table 3 of the machine frame sustains the shoe jack and also the devices for clamping and positioning the shoe with relation to the nailing devices operating in the cross head 5. While the shoe support, as such, constitutes the subject matter of a separate application, a sufficient description is herein given of the shoe support and shoe positioning devices which coöperate therewith to enable those skilled in the art to clearly understand the same and the relations thereof in positioning a shoe with respect to the nailing instrumentalities, it being understood, of course, that the relative position assumed by the shoe and nailing devices determines the final appearance of the heel when attached to the shoe.

Having reference to Fig. 11, the support 3 carries a sliding table 21 movable in suitable ways in the support 3. On the sliding table 21 is mounted a swinging table 22, Fig. 11, having angular movement in suitable guides 23 and a turning circle 24 transversely of the machine. On the swinging table 22 is mounted the jack slide 25 carrying a suitable jack or shoe supporting element and a second slide 26, Fig. 11, which, for identification, may be known as the positioning slide, said slide supporting the clamping and positioning devices for the shoe. The jack slide and positioning slide have forward and backward movement in suitable guideways on the swinging table, said guideways being well shown in Figs. 10 and 11.

The jack may comprise a heel and toe support, as indicated in Fig. 11, provided with desirable adjustments, and the jack as a whole is mounted upon a spindle 27 which has vertical movement in a guiding sleeve 28 rising from the jack slide 25. A shoe with a last still within the upper is mounted, sole up, on this jack preparatory to any movement of the machine parts.

Rising from the positioning slide 26 are the guides 29, Figs. 10 and 11, between which is mounted the slide 30, the upper portion of said slide, as at 31, constituting a back stop to engage the heel portion of the shoe when the jack has been moved to carry the shoe into nailing position, and said slide likewise affording a support for the counter clamps and side gages, as will presently appear.

The counter clamps 32 are carried at the upper ends of lever arms 33 fulcrumed by their lower ends upon horizontally arranged pins 34, Figs. 9 and 11. Secured to and extending from each of these pins 34 is a lever arm 35, Fig. 9, which lever arms are provided at their inner ends with crossing slots engaged by a pin 36 in a slide block or yoke 37, Figs. 9 and 11, suitably guided for vertical movement and having an upwardly projecting stem surrounded by a spring 38, the normal tendency of which is to depress the yoke 37, and, as will be evident, throw the counter clamps 32 toward each other or into clamping position.

One of the levers 33, carrying a counter clamp member, has a pin 39, Fig. 8, which engages a slide 40, the end of said slide bearing upon a cam 41, Fig. 8, and held in such engagement by the tension of the spring 38, as will be apparent. Obviously, upon rotation of the cam 41, in a manner to be hereinafter described, the counter clamps will be moved either by said cam or their actuating spring 38 to open and close the counter clamps.

After the shoe has been jacked and has been clamped in the machine between the counter clamps, it is in some position beneath the nail block and driving devices and the operator must determine by his eye or by several trials of the machine whether or not it is in correct alinement with such devices and whether or not the heel is correctly pointed relatively thereto. The swinging table 22 is used to turn the shoe angularly in order that it may be in proper position beneath the heel carried by the heel attaching devices to have the heel point in the desired direction when attached. Heretofore, in angularly adjusting a shoe with relation to the heel by swinging a table on which the shoe jack is mounted, the limit of swing has been determined by adjustable stops on the table. As is well known to those skilled in the art, counter clamps do not hold all shoes of one kind invariably in the same position as there is considerable opportunity for loose play of the shoe between the clamps. Therefore a swinging table alone is unreliable to determine a similar pointing of the heel on a series of shoes, as the heel will be pointed according to the position assumed by the shoe within the counter clamps. It is desirable that some means be provided to aid the angular adjustment of a shoe by means of a swinging table so that each shoe of the same kind invariably reaches the same angular position with relation to the heel before the heel is attached.

With the above ends in view there are mounted upon either side of the movable slide 30 horizontally arranged arms 42, Figs. 10 and 11, which turn about pivots 43 carried by the slide, said arms carrying at their free ends adjustable gages 44. These arms, which for identification may be known as the forepart gage arms, travel in guides 45, Fig. 10, and their rear ends are connected by a spring 46 which normally maintains the gages 44 at the outer ends of their path of movement. When a right shoe is to have the heel attached, the left gage, Fig. 10, is brought to a position so that in moving the shoe angularly by swinging the table 22 to properly point the heel, the operator has a stop against which the inner edge of the sole of the shoe may be brought, thereby correctly determining the position that the shoe should assume in the counter clamps 32. When operating upon a left shoe the right forepart gage will be brought forward for a similar purpose.

Before a shoe is finally placed in position with relation to the heel mechanism it is held at the front of the machine for convenient handling of the shoe, as in Fig. 11, and must be moved backwardly into the machine to gain its heel attaching position between the counter clamps. As one means of thus holding the jack slide 25 in its forward position there is pivoted at 47, Fig. 8, a hand operated lever 48, the upwardly projecting arm 49 of which extends along the sleeve 28 of the jack slide. Secured to the outer end of the lever 48 is a locking pin 50, Fig. 8, the lower end of which normally projects downward into engagement with a tooth 51 carried by the swinging table, the construction being such that when the parts are in position, as indicated in Fig. 8, the jack will be held in its outer position, Fig. 11, but when the upper end of the hand piece 49 is closed toward the sleeve 28 of the jack slide, the pin 50 will be removed from the teeth 51 and permit the spring 52, Fig. 11, to draw the jack slide and jack backwardly to a position determined by the positioning slide 26 and its attached parts, it being understood that one end of the spring 52 is connected as at 53 to the jack slide and its other end is connected as at 54 to a part which insures tension of the spring 52 at the time the jack is to be moved, all of which will more fully hereinafter appear.

As hereinbefore stated the counter clamps and forepart gages are carried by the slide 30 which likewise carries the back stop 31. It is desirable that the slide 30 and its attached parts shall be depressed and held in depressed position at the conclusion of the nailing and top lift applying operations, so that it becomes necessary to raise the slide and its attached parts to a position to contact with the shoe at their respective points of coöperation therewith when the jacked shoe is moved back into position between the counter clamps, as will be understood. Connected to the slide 30 at 55, Fig. 11, is a link 56, the lower end of which is connected at 57 to one arm of a lever 58 pivoted at 59 and normally under the influence of a spring 60, Fig. 11, tending to lift the slide 30. Secured to the slide 30, and as one means of restraining it from response to the demands of the spring 60, is a series of rack teeth 61 adapted to be engaged by one of a series of pawls 62 pivoted at 63 to the positioning slide 26 and normally under the influence of a spring plunger 64. Projecting from the pivotal point of the pawls 62 at 63 is an actuating arm 65 having a cam end 66, and extending rearward of the pivotal point 63 is a toe 67 adapted to engage a locking dog 68 normally under the influence of a spring plunger 69, said dog 68 having a forwardly extending arm 70. The dog 68 has two shoulders 71 and 72, either one of which may be engaged by the toe 67, and the construction being such that when the toe 67 is in engagement with the shoulder 71, the pawls 62 will be in engagement with the rack teeth 61 and hold the slide 30 from upward movement responsive to the actuating spring 60, Fig. 11, but when the arm 65 is lifted it will detach the toe 67 from the shoulder 71, thereby freeing the pawls 62 from the rack teeth 61 to permit the slide to respond to the demands of its spring 60, and the toe 67 will engage with the shoulder 72 to hold the parts in this position.

Obviously the extent of upward movement of the slide 30, in order to bring the back gage counter clamps and side gages into proper coöperative relation with the shoe upon the jack, should be controlled by the position of the jack itself and to this end the head 73, Fig. 11, of the jack elevating or measuring means, as will presently be described, is provided with a stop 74 in the path of movement of the lever arm 58, so that when the slide has been raised to an extent defined by said stop the parts carried by the slide will be in proper co-acting relation as to height with respect to the shoe on the jack.

In order that the arm 65 carrying the pawls 62 may trip said pawls and free the slide as the jack moves the shoe into position between the counter clamps, said jack is provided with a roll or trip 75, Fig. 12, carried on a pivoted finger 76 pivoted at 77 on the jack slide and normally under the influence of a spring 78, a stop being provided to prevent movement of the finger 76 to the right around its pivot under the action of the spring 78, but permitting movement thereof to the left, Fig. 12, as the jack moves back to the initial position, taking the roll 75 from under the arm 65.

In order that, when the slide is depressed at the conclusion of the nailing operation, it may be held so depressed, one of the cross head actuating rods 4 is provided with a depressing finger 79, Figs. 10 and 11, which is adapted to contact with the arm 70, Figs. 11 and 12, trip the dog 68, and permit the pawls 62 to move into coöperative relation with the rack teeth 61, the parts at the conclusion of the operation described being as indicated in Fig. 11.

The jack shoe having been moved backward between the counter clamps and forepart gages, and the slide 30 with its counter clamps and forepart gages having been raised to the position dictated by the position of the jack, the swinging table 22, the forepart gage carrying arms 42 and the counter clamps are to be operated to position and hold the shoe with respect to the nailing devices. The means for effecting these movements may be briefly set forth as follows.

Pivotally mounted at 80, Figs. 2 and 13, are the two treadle levers 81 and 82 each normally under the influence of a spring 83 tending to keep the foot end of the said treadle levers in raised position, as will be evident from Figs. 2 and 13. Suitably supported in brackets depending from the under side of the table or fixed support 3, Figs. 9 and 13, is a rock shaft 84, the purpose of which is to effect swinging movement of the shoe support or swinging table to the right or left, according to the character of shoe being treated, to likewise swing one of the forepart gage arms 42 into operative position, and to effect closing movement of the counter clamps.

Secured to the rock shaft 84 is the yoke 85 having connected at each end thereof a link 86 provided with a rounded seat 87 in which is adapted to be received a pin 88 carried on the free end of a lever 89 pivoted at 90 to the machine frame standard and normally under the influence of a spring 91 acting to depress the pin 88. Obviously when the pin 88 is in engagement with both of the rounded seats 87 on the two links 86, 86, as indicated in Fig. 2, the rock shaft 84 will be held in the position indicated in Fig. 2, but if either of said hooked seats 87 is thrown from beneath the pin 88, then the tension of the spring 91 acting through the pin 88 on the other link 86 will rock the rock shaft 84, as indicated in Fig. 13. In order to effect this adjustment, and consequently the rocking movement of the shaft 84 either to the right or left, there is pivoted to a suitable bracket 92, Fig. 13, as at 93, the trip levers 94, 95, the lower ends of which are in the path of movement of the upper horn shaped end 96, 97, of the treadle levers 81, 82, respectively, and the upper portions of the trip levers 94, 95 are slotted at 98, 99 for the reception of suitable pins or rolls 100 carried by the links 86 below the hooked seats 87 thereof, the construction being such that upon depression of either one of the treadles 81, 82, one of the trip levers 94, 95 corresponding thereto will be moved on its fulcrum 93 and the seat 87 of the link 86 connected thereto will be moved from beneath the pin 88 so that the shaft 84 will be rocked in one direction or the other according to the desired adjustment to be given to the swinging table and the other parts referred to.

Mounted on the rock shaft 84, Fig. 9, is a pinion 101 in engagement with a like pinion 102 on a short shaft 103 extending upward through the fixed table or support 3, the upper end of said shaft 103 carrying an eccentrically mounted and adjustable pin 104. As indicated in Figs. 9 and 10, the swinging table has a slot 105 in which is mounted to slide a block 106 carried by the eccentrically mounted pin 104, the construction being such that upon rotation of the shaft 103 to the right or left the eccentrically mounted pin 104 through the block 106 will swing the table 22 to the right or left.

As one means of moving the forepart gages so as to throw one or the other into coöperative relation with the shoe and define its position with respect to the heel nailing mechanism, as hereinbefore described, the said rock shaft 84 is provided with segments 107, each adapted to engage a longitudinally sliding rack bar 108, Fig. 9, carried by suitable guideways of the stationary table 3. The rack bars 108 each engage a suitable pinion 109 mounted, one on each of the upright shafts 110, Figs. 9 and 10, said shafts being properly guided by bearings 111 projecting from the side framing of the machine. The shafts 110 each carry a cam 112 adapted to bear on the outer face of the forepart gage arms 42, the construction being such that upon rotation of the shafts 110 through the rock shaft 84 one or the other of these forepart gage arms will be moved into coöperative relation with the shoe to position its forepart gage 44, and since these shafts 110 rotate in the same direction, as will be understood, one of the cams 112 will move its gage arm into gaging position while the concentric operation of the other cam allows the other arm to remain at rest.

As hereinbefore described, one of the counter clamps has a pin 39, Fig. 8, engaging a slide 40 which is held in contact with the cam 41 on one of the shafts 110, so that upon rotative movement of said shafts 110 the counter clamps will be moved either by the cam 41 to separate such clamps or to permit the spring 38 to move the counter clamps into clamping position upon the shoe.

Certain adjusting mechanisms are herein shown for adjusting the position of the forepart gage arms and also for adjusting the counter clamps, but these details form the subject matter of a separate application and need not therefore be herein specifically described.

In operating upon shoes in which the wooden last is still retained, it is necessary, as is well known by those skilled in the art, to measure the heel in order that the wooden last will not be broken by applying too much pressure. This measuring operation, in the illustrated embodiment of the invention, is preferably performed before the automatic operation of the machine in attaching the heel and top lift.

Before describing the preferred construction of measuring mechanism, it is convenient to describe the various positions in which it may be desirable to place a heel with relation to the shoe, and the means contemplated by the present invention for effecting such varying relationship. When the top lift carrier is brought into position beneath the nail block, the top lift sustained thereby should be in such position with relation to the heel seat of the shoe that when the heel is trimmed by using the top lift as a guide, as is customary, the desired appearance of the heel with relation to the shoe will be secured. If a right or left appearance of the heel is not required, it is desirable that when the shoe is viewed from the rear the planes formed by the lateral surface of the heel between the top lift and the outer sole, upon either side of the shoe, extend at the same angle to the tread face of the top lift. Such an alinement of the heel will give the shoe the trim appearance desired. It is obvious that this alinement will be obtained if the top lift be secured to the heel in such position that the center of its back is in vertical alinement with the heel seam which in turn is at the center of the back of the heel seat of the shoe. On the other hand, if the center of the back of the top lift is not centrally arranged with relation to the back of the heel seat of the shoe, when the heel is trimmed with relation to a top lift so placed, the lateral surface of the heel at one side will extend at a greater angle to the face of the top lift than the lateral surface at the other side.

If it be assumed that a top lift has been correctly alined, as just described, above the heel seat of the shoe which has been placed square with a series of nail holes in the driver block, it is obvious that if such shoe be then adjusted for pointing the heel by turning the shoe angularly about a center somewhere within the perimeter of the top lift, it will throw the center of the back of the heel seat of the shoe to one side or the other of the center of the back of the top lift. Under these conditions the desired square appearance of a finished heel will not be obtained even though the angular adjustment for pointing has been correctly made. Such a condition may be remedied by placing the pivot on which the shoe is turned substantially vertically in line with the center of the back of the top lift instead of within its perimeter. This point is chosen because all top lifts, of whatever size, when secured to a heel, overlap substantially the same distance beyond the rearmost nail, therefore it will not be necessary to change a center so selected in changing the size of the top lift. The distance of the center of the back of the top lift forward of the center of the back of the heel seat is so slight that for all practical purposes a turning center chosen as described will give the same results as if it were in fact in vertical alinement with the center of the back of the heel seat.

In adjusting a shoe, whether right or left, for a desired pointing of the heel, the shoe is swung in the direction of its inner side. Under this condition it is obvious that if the shoe be swung about an axis beyond the center of the back of the stationary top lift, the center of the back of the heel seat of the shoe will be moved to a position on the inner side, with relation to the shoe, of the center of the back of the top lift. If, however, the shoe be swung in the direction named about an axis in front of the center of the back of the stationary top lift (as, for instance, within the perimeter of the top lift), the center of the back of the heel seat of the shoe will be moved to a position on the outer side, with relation to the shoe, of the center of the back of the top lift. The heel when trimmed will then have a right or left appearance on the shoe according to the position of the axis about which the shoe is swung.

A brief description will now be given of one means for adjusting the axis about which the swinging table 22 moves so that the shoe may be properly positioned beneath the stationary top lift when the top lift carrier is brought into position beneath the nail block. As hereinbefore noted, the swinging table 22 is carried by the sliding table 21 which has movement in and out of the machine with reference to the cross head or nailing devices, therefore any movement of the sliding table 21 in a direction transverse to the cross head will move the pivotal point of the swinging table relatively to the top lift held in position beneath the nail block of the cross head. Before any work is performed upon the machine the sliding table 21 should be adjusted with relation to the cross head in such manner that the pivotal point of the swinging table 22 is in the desired relation to the center of the back of the top lift when the top lift is in spanking position. This may be accomplished by any suitable means as, for instance, the hand lever 113, Fig. 10, pivoted on the fixed table or support 3 and engaging at its inner end a pin 114 on the sliding table 21. The sliding table 21 is provided with a projection or holding lug 115, Fig. 10, having holes 116, 117 and 118 through which a pin 119 is adapted to be passed to register any one of the holes in the lug 115 with a hole beneath the series in the supporting or stationary table 3. When the sliding table 21 is thus adjusted it is locked in adjusted position, and should the pin 119 be passed through the hole 117 in the lug 115 into a hole directly beneath, as shown in Fig. 10, the axis about which the table 22 swings will be in vertical alinement with the center of the back of a top lift correctly positioned with relation to the nail holes in the nail block. When the forward or the rear hole is thus in register with the hole beneath, and the table 21 secured in such position by the pin 119, the axis named is beyond or forward, respectively, of the center of the back of the top lift. Means is thus provided for preliminarily adjusting the axis of the swinging table to give a square or a right or left appearance to the heel when trimmed.

When operating upon heels of varying pitch, the selected position of the axis of the swinging table 22 should remain unaltered, the proper adjustment being obtained by movement of the shoe relatively to the top lift when in spanking position on the cross head. Therefore the positioning slide 26, Figs. 10 and 11, which supports the back gage and counter clamps is connected by a threaded lug 120, Fig. 10, to an adjusting rod 121 having an operating hand wheel 122, Fig. 10, and suitably mounted for adjusting the positioning slide 26 forward and backward upon the swinging table 22 with relation to its axis of movement. Obviously after the shoe has been jacked and the shaft moved backward between the counter clamps, and the counter clamps closed upon the shoe, adjustment of the positioning slide 26 will also carry with it the jack slide 25 supporting the jack, and the position of the heel seat of the shoe, with relation to the top lift, may thus conveniently be adjusted. It will be noted, however, that in either of the adjustments just referred to the axis of the swinging table 22 with relation to the top lift remains unchanged, therefore when the swinging table is turned about its center of rotation, carrying the shoe with it, neither of these adjustments will effect the desired appearance of the heel when trimmed.

The shoe having been jacked, as described, and positioned in the counter clamps and by the forepart gages, is next to be measured, that is, the shoe support is to be raised into such position with respect to the heel attaching mechanism as to give the proper compression to the heel and effect the desired attachment. The heel measuring mechanism and its operative connections and adjuncts are best shown by Figs. 2 and 5. The jack spindle 27, Figs. 5 and 11, is supported for movement toward and from heel attaching position in the block 73, Figs. 5 and 11, said block being provided with suitable guideways 123 for the lower end 124 of the jack spindle 27. The measuring spindle extends downward and within a frame 125, Fig. 5, depending from the stationary table or support 3, and is preferably formed of two pairs of right and left hand screws each of which pairs are connected by a toothed sleeve in the form of an elongated pinion. Each pair of screws with its connecting sleeve form a turn-buckle. The upper pair 126 and 127 of right and left screws are connected by a sleeve 128, while the lower pair of right and left screws 129 and 130, Fig. 5, are connected by a sleeve 131. The screws 127 and 129 are held from rotation by a collar 132 pinned thereto and moving in suitable guides in the frame 125. Thus all the screws combine to form substantially a single spindle which, however, is capable of longitudinal adjustment. The lower screw 130 is fixed to a support hereinafter described. The upper screw 126 is pinned to the head 73 which supports the jack spindle 27. The head 73 is mounted for vertical movement in suitable guideways 133, Fig. 5, so that any vertical adjusting movement of the measuring spindle by the right and left screws and their operating means will be communicated to the jack spindle, as will be obvious. The upper pair of screws are of such pitch that on turning the sleeve 128 an easy and quick adjustment may be obtained, and in order to obtain such adjustment there is provided a hand wheel 134 mounted in the bracket 135, Fig. 5, and provided with a series of peripheral teeth 136 adapted to engage complemental teeth in the upper sleeve 128. Obviously by means of the hand wheel 134 the operator may initially rotate the sleeve 128 and thereby lift the jack spindle and with it the jack to any desired height with relation to the heel supported in the nail block. Of course the counter clamps should move vertically with the shoe so as to retain the proper relationship between them and the work, such movement being permitted to the counter clamps, or forepart gages and slide carrying such parts, by reason of the stop 74 on the head 73 moving upward and permitting the spring 60, Fig. 11, to move the slide upward, as will be clear. Thus the jack with its shoe, the counter clamps and the forepart gages all rise simultaneously when the sleeve 128 is rotated by means of the hand wheel 134. This adjustment by means of the hand wheel 134 and its connections is preferably formed before either of the treadles 81, 82 is depressed.

After the shoe has been placed upon the jack and has been clamped and adjusted in position, as heretofore described, it is raised until it meets and measures the heel supported by the nail block by mechanism actuated by either of the treadles 81, 82. To this end a rack 137, Fig. 7, is mounted in the frame 125 in position to mesh with the sleeve 131, whereby reciprocation of the rack will rotate the sleeve and will separate the right and left screws 129, 130 to elevate the block 73 and therethrough elevate the jack and shoe. The rack 137 is moved in a direction to rotate the sleeve by connections with a lever 138, Fig. 2, the upper part of which lever carries a yoke 139, operatively connected to the slide 137. The slide operating lever 138 is pivoted at 140, Fig. 2, and carries a roll or abutment 141 which is in the path of the projections 142 on the arms 96, 97, Figs. 2 and 13, of the treadle levers 81, 82, the construction being such that upon depression of either the right or left treadle one of the arms 96 and 97 will be moved contra-clockwise, its upper end first causing the swinging adjustment of the table and forepart gages and the closing of the counter clamps and then or about this time one of the lugs 142 meets the roll 141, thereby moving the actuating lever 138 in a direction to move the rack 137 and consequently raise the jack. The roll 141 is preferably mounted on a lever 141$^a$, pivoted at 142$^a$ to a fixed part of the frame and connected to a link 143$^a$ jointed to said lever 138.

The lever 138 is normally held in locked position with the jack lowered, as indicated in Fig. 2, by means of a locking lever 143 pivoted at 144 and normally held in the position indicated in Fig. 2 by means of a spring 145. Pivotally mounted adjacent the locking lever 143 is an arm 146 pivoted at 147 and carrying a side projecting lug 148 which underlies the treadle levers 81, 82, and connected to said arm 146 is a trip piece 149 adapted, when the arm 146 is depressed, to engage with the locking lever 143, or an adjusting stud 150 thereon, the construction being such that upon depression of either of the treadle levers 81, 82, the arms 146 will be depressed and cause the trip lug 149 to trip or disengage the locking lever 143 from the locking engagement with the operating lever 138.

In order to hold the slide rack 137 in the position to which it has been moved by its actuating lever 138, a series of locking pins 151, Fig. 6, are employed, said locking pins being preferably formed as slides having a spring 152 tending normally to throw them into locking engagement with the slide rack 137. A series of these locking pins is employed in order to insure a proper locking of the slide rack 137 without lost or back motion, as will be obvious, and mounted upon a suitable pivot 153 is a locking pin withdrawing arm 154, Fig. 6, said arm engaging at its lower end slots formed in the upper sides of the locking pins, as indicated. Pivotally mounted upon the bracket 155, Fig. 5, is an actuating arm 156 for unlocking the slide, said actuating arm carrying at its lower end a roll 157 adapted to engage and bear upon a cam 158, Fig. 4, mounted upon the counter-shaft 11, the said cam 158 being preferably formed as part of or projecting from the cam 13, Figs. 4 and 15. It will thus be seen that while the measuring or raising of the jack into heel measuring position is performed by one of the foot treadles, supplemented, it may be, as by a spring 159, Fig. 2, which bears against the rear end 160 of said actuating lever 138, and said jack when thus raised in measuring position is locked, it is unlocked by the action of the machine, as will hereinafter appear, and the invention contemplates means operative by the machine itself for positively moving the rack bar 137 in the opposite direction to lower the jack, as will now be described. Connected to the actuating lever 138, Fig. 2, is a link 161 which is likewise connected at 162 to a lever 163, Fig. 2, pivoted to a bracket at 104 and having a roll or pin 165 adapted to be struck by a cam 166 on the driving shaft 8. Figs. 2 and 15, the construction being such that upon rotation of the driving and counter-shafts when about at the completion of the top lift attaching movements, the rack bar 137 will be unlocked by power and then by power it will be drawn in a direction to bring the jack into lowered or original position.

From the construction thus far described it will be seen that the shoe having been placed upon the jack and the jack moved back into position beneath the nailing devices, the counter clamps and forepart gages are raised into position determined by the jack, and above the shoe support carried by the swinging table, and the forepart gages are swung to the right or left by an appropriate treadle, and the counter clamps are moved into clamping position with relation to the shoe. By the means also described, the jacked shoe has been adjusted by hand and then the heel measured by the treadle actuated rack bar. All these movements have been under the control of the operator either by hand or treadle manipulating means. The shoe being now in proper position with respect to the nailing devices, the automatic operations of the machine are now in order to the end that a heel, loaded or otherwise, may be attached to the heel seat and a top lift properly spanked thereon.

The driving shaft 8 may be driven from any suitable source of power through a suitable clutch connecting and disconnecting means, the form of such clutch connection, as indicated in Fig. 14, being that commonly known as the "Horton" clutch, the construction thereof, being well understood and forming no essential part of the present invention, need not be specifically described. Pivotally mounted at 167, Fig. 14, is the usual stop member 168 of a Horton clutch adapted, when in the position indicated in Fig. 14, to engage by its upper end a stop 169 to cause the two members of the clutch to be disengaged, as understood by those skilled in the art. The stop member 168 is connected by a link 170 to an arm 171 secured to the cross shaft 172, Figs. 4 and 14. Secured to the shaft 172 in proximity to the forward end of the treadle levers 81 and 82 is an upwardly extending arm 173 pivoted at 174 to the lower end of a knee lever 175 pivoted at 176, the construction being such that upon pressing the upper end of the knee lever 175, the shaft 172 will be rocked and the usual stop member 168 will be withdrawn from the stop 169, thereby permitting the clutch members to be engaged and the shaft 8 driven, as well understood.

It is desirable that the automatic operations of the machine in attaching a heel and top lift may not be possible in case the heel has not been properly measured by the heel measuring means hereinbefore described, and provision is herein made to prevent movement of the stop member 168 and consequent automatic operation of the machine in case the action of the heel measuring devices has measured either too little or too much.

To the above ends the arm 173, Figs. 2 and 4, is provided with a slotted portion 177 and two stop shoulders 178 and 179. Pivotally mounted at 180, Fig. 2, near the rear of the machine frame at the base thereof is a measuring indicating lever 181 extending forward and through the slot 177 of the arm 173, the forward end 182 of said lever being turned, as indicated, to engage one or the other of the shoulders 178, 179, on the arm 173 in case the end 182 of said measuring indicating lever 181 is either too high or too low, so that in either case the arm 173 will be locked from forward movement and consequently the shaft 172 cannot be turned to engage the clutch members. Between the stops 178, 179 of the arm 173 the end 182 of the measuring indicating lever 181 may pass provided said lever is in central position, in which case operation of the knee lever 175 may cause movement of the shaft 172 and consequent engagement of the clutch members. Mounted on the actuating lever 138 for moving the rack slide 137 of the measuring mechanism is a pin or roll 183, which, when said actuating lever 138 is unlocked and moved by the treadle means hereinbefore described, contacts with the measuring indicating lever 181 and raises its end 182. If the measuring or raising of the jack has been too much the end 182 of the lever will be raised so that it will overlie the shoulder 178 of the arm 173, and if it has been too little, the end 182 of the lever 181 will overlie the lower stop 179. In either case it will prevent automatic operation of the machine while such imperfect measuring of the heel remains. If the heel has been properly measured, the end 182 of the measuring indicating lever 181 will stand midway between the stops 178, 179 and the knee lever may then be moved to cause automatic operation of the machine.

Above the treadle levers is a bracket or stop 185 and, since two treadle levers 81 and 82 are provided, it is desirable that means be employed to prevent the simultaneous actuation of these levers and to this end, Fig. 3, there is pivoted at 184 adjacent the treadle levers 81 and 82, the rigidly connected and diverging arms 186 which are normally held in the position indicated in Fig. 3 by a spring 187, the construction being such that upon depression of one of the treadle levers 81 or 82 the diverging arms 186 will be swung in one or the other direction and thereby prevent depression of the other treadle.

As is well known by those skilled in the art it is desirable and customary in attaching heels to compress the heels either before or during the driving of the attaching nails. This is accomplished by a downward movement of the cross head 5 in connection with the mechanism to be described. It is also desirable that, during the compression of the heel and the operation of the heel attaching devices, not only the rack bar 137 of the measuring mechanism be locked from movement so that the various screws forming the spindle of the measuring mechanism may act as a unitary support, as hereinbefore described, but it is also desirable that the jack slide be locked from accidental or unintentional movement.

To effect the locking of the jack slide there is mounted at 188, Fig. 5, a lever, one arm 189 of which carries a roll 190 resting upon a cam 191 on to the driving shaft 8. The other arm 192 of this lever, Figs. 4 and 5, is connected to the lower end of a locking rod 193, said rod 193 preferably passing through the arm 192 of this lever, and provided with a spring 194 interposed between the lower surface of said arm and proper adjusting nuts 195, whereby the action of the lever upon the locking rod will, to an extent, be a yielding one. The upper portion of the locking rod 193 extends through the stationary table or support 3 and carries a locking head 196, which upon depression of the locking rod 193 is brought into locking engagement with the jack slide, thereby holding the parts in adjusted position.

It is obvious that in the measuring operation unless the screw 130, Fig. 5, is held from downward movement, the rotation of the sleeve 131 will impart equal but opposite movements to both of the screws 129 and 130. If, however, the screw 130 is held from downward movement, the rotation of the sleeve 131 will act to move the upper screw through twice the distance before obtainable. In order to maintain the screw 130 stationary during the measuring operation, the support 197 which sustains the screws forming the measuring spindle is normally locked against downward movement during the action of the measuring rack 137. The support 197 is slotted, as shown in Fig. 5, to embrace the counter-shaft 11. The locking of the spindle is accomplished by means of a bell crank lever 198, Fig. 5, pivoted upon the frame 125 at 199, said lever 198 carrying a pin and roller 200, Fig. 5, adapted to engage beneath the lug 201 projecting from the support 197. The upper arm 202 of the lever 198 is provided with a roller 203 engaging a cam 204, Figs. 5 and 15, conveniently formed upon the gear 205 mounted on the sleeve 206 sustained by the driving shaft 8, said gear 205 being preferably driven as by a gear 207 on the sleeve 208 rotatable with the counter-shaft 11. A spring 209 is arranged to normally maintain the roller 203 in contact with its cam. Thus the measuring spindle support 197 is held against downward movement during the measuring operation, when said measuring is performed by actuation either of the hand wheel 134 or by either of the foot treadles 81, 82.

The downward movement of the cross head 5 to compress the heel is through a fixed distance determined by the general character and design of the cross head operating cams 12 and 13. Just prior to the descent of the cross head, the cam 204 operates to move the roller 200 of the lever 198 out from beneath the lug or projection 201 on the measuring spindle support 197, so that as the cross head descends it carries the jack and its supported shoe downward before it by depression of the jack spindle 27, the measuring spindle and the measuring spindle support. These parts are sustained when the roller 200 is removed from beneath its lug or projection 201 by means of a strong leaf spring 210, Fig. 5, bearing upwardly against the lower end of the measuring spindle support 197. This spring retreats before the downwardly moving parts as the cross head descends. The amount of compression to be placed upon the heel is determined by an adjusting device carried by the measuring spindle support 197, coöperating with a fixed or stationary abutment, as will now be described.

The lower end of the spindle support 197 is threaded, Fig. 5, and mounted on such threaded portion is a collared sleeve 211, Fig. 5, which may be adjusted longitudinally of the support by turning said interiorly threaded sleeve on the screw-threaded portion of the spindle support, and then locked in desired position by a latch 212 engaging one of a series of teeth 213 on the collared portion of said sleeve. The sleeve 211 moves in a guide 214 rising from the base of the machine frame, Fig. 5. If, now, the distance between the upper surface of the guide 214 and the under surface of the collar 213 of the sleeve 211 is equal to the vertical movement of the cross head there will of course be no compression of the heel. If, however, this distance is less than the vertical movement of the cross head, the heel will be compressed an amount equal to the difference between this distance and the movement of the cross head. Before the machine is started, therefore, the sleeve 211 is adjusted to bring its collar 213 the correct distance from the top of the guide 214 for the amount of compression desired to be placed upon the kind of heel which is to be treated. The first operation, then, after the machine is started on its automatic movement by manipulation of the knee lever 175, is to move the cross head, jack and measuring spindle downward until the collar on the sleeve meets the top of the guide 214 when the shoe will be held against further downward movement and the succeeding downward movement of the cross head will serve to compress the heel the desired amount.

The heel may be attached to the shoe either during the compression or immediately thereafter, and to this end driving devices, the preferable form of which and their actuating means are shown in Figs. 1, 8 and 9, are put into operation. A cam 215, Fig. 15, is mounted on the counter-shaft 11 so as to rotate therewith and is directly engaged by a cam roll 217 at the lower end of a vertically reciprocating driver actuating rod 216, Figs. 4 and 8, said rod being screw-threaded as at 218, Fig. 8, at its upper end. Engaging the screw threads 218 is one end of a sleeve 219, Fig. 8, which in turn receives the lower end of an actuating rod 220 connected by a universal joint 221, Fig. 8, to the outer end of a transversely arranged lever 222 pivoted at 223 in the cross head 5. The inner end of the lever 222 projects to a position over the nail block 17 and is connected by means of a yoke 224 and slide block 225, Fig. 8, centrally of a plunger 226. The lower end of the plunger 226 is provided with a removable driver block 19 carrying the usual gang of drivers 20.

By preference, the machine is intended to operate upon loaded heels, such, for instance, as produced by the heel loading machine of co-pending application for United States Patent, Serial No. 412,727, filed January 27, 1908, Renewal Ser. No. 532,250, filed December 9, 1909, in which the nails have been driven at an angle to the tread face and toward the back of the heel for a purpose well known by those skilled in the art. Therefore, in the illustrative embodiment of the invention, the plunger 226 which operates the nail drivers is arranged in the cross head at an angle to the vertical and for movement obliquely in the general direction of the nails in the loaded heel which has been previously placed in position beneath the nail block 17, all as well illustrated in Figs. 8 and 18. To this end the pivot 223 of the lever 222 is placed at an angle with the cross head, see Fig. 19, and the actuating rod 220 is provided with the universal joint 221 connecting it to said lever 222 to thereby permit proper angular movement of said lever with relation to its actuator. The plunger 226 is normally maintained in its elevated position with the drivers 20 at the upper end of their stroke by means of a spring 228, Fig. 8, bearing on a collar 229 secured to the actuator rod 220 and against the under side of the cross head 5, all as will be clear from Fig. 8.

During the downward movement of the cross head, while it is compressing the heel, the cam roll on the driver actuating rod 216 is not being raised by its cam, and although the rod 216 may be thus held from downward movement, there is no actuation of the drivers because the actuator rod 220 is at this time traveling downward in the telescopic joint formed by it with the upper part of the sleeve 219, as clearly shown by Fig. 8. This sleeve 219 has been previously adjusted vertically upon the screw 218 of rod 216 and locked in an adjusted position by the lock 231 to the end that the stroke of the cross head will operate to bring the lower end 232 of the rod 220 to the bottom of the upper opening 230, Fig. 8, as said cross head is given its reciprocating movement. After the heel has been compressed, or during the latter part of the compression, the cam 215, Figs. 4 and 15, operates to raise the rod 216, and because of the previous closing of the telescopic joint between the sleeve 219 and rod 220, the rod 220 is also raised and the lever 222 in the cross head is actuated in the direction to move the drivers quickly downward to drive the nails, which are of such length that they may be clenched in the usual manner upon the inner surface of the heel seat of the shoe.

The heel having been attached to the shoe, it is now ready to receive the top lift. The means for placing a top lift in position to be spanked on to nails left projecting from the heel is best illustrated in Figs. 1, 2 and 9. Referring to Fig. 1, the top lift holding devices are sustained by a supporting carrier 233 which in turn is connected by arms 234 to a transverse rock shaft 235 on the rear side of the cross head, Figs. 1 and 9. This transverse rock shaft 235 is connected by a crank arm, as shown, to an actuating rod 236, Figs. 1 and 9. The lower end of this actuating rod 236 is connected at 237, Fig. 2, to an arm 238 of a bell crank lever pivoted at 239, the other arm 240 of which is connected to a link 241, Fig. 2, which is itself jointed at 242 to the arm 243 of a bell crank lever pivoted at 244 and having its other arm 245 provided with a roll 246 engaging a cam 247 mounted on a driving shaft 8, Figs. 2 and 15. These connections and the proportions of the parts are such that as the cross head 5 descends, the top lift carrier actuating rod also descends, thereby, through its connections to the rock shaft 235, Figs. 1 and 9, turning the top lift carrier about said rock shaft as a pivot downwardly and toward its operative position just beneath the nail block, Fig. 8. The construction of the cam groove 247 is such, however, that the movement of the various connecting levers is taken up and the downward movement of the rod 236 is not hindered. The top lift carrier, however, only moves partially through its path of movement to position beneath the cross head during the down stroke of the cross head, and upon the up stroke of said cross head, which occurs immediately after the nails are driven, the movement of the top lift carrier is continued until it is finally placed in position beneath the nail block during the dwell of the cross head at the end of its up movement.

In order that the shoe may not follow the cross head upward, the lever 198, Fig. 5, has a roll 248, Fig. 5, at its lower end which, when the spindle support 197 is in its lowered position, as hereinbefore described, will engage above the projecting lug 201 of said spindle and hold the parts in lowered position against the action of the spring 210 which normally tends to raise the support. The actuating cams for the cross head are preferably so designed that the cross head ascends on this stroke after attaching the heel higher than its initial position to compensate for the added thickness of the top lift carrier and top lift which are now placed beneath the nail block. The cross head actuating cams and the rods thereof operate to cause the cross head to again descend to spank on the top lift, this downward movement being of substantially the same extent as the original downward movement, which will terminate the stroke of the cross head in the correct position for properly compressing and attaching the top lift to the heel.

As top lifts vary somewhat in thickness it is desirable that means be provided to adjust the top lift bodily relatively to the heel so that too much pressure will not be applied from the constant stroke of the cross head. This may be most conveniently done with the top lift carrier in operative position and, in the illustrative embodiment of the invention, Figs. 1 and 8, this is effected by moving the top lift holding devices relatively to their support. These holding devices may be of any convenient construction, but preferably they are similar in principle to the holding devices described in a co-pending application for United States patent, Serial No. 409,142, filed January 3, 1908. These devices are carried by a plate 249, Fig. 8, mounted for movement on suitable guides toward and away from the base plate of the carrier. The plate 249 and the carrier base plate are each provided with dovetailed guideways, Fig. 8, and fitting within these guideways is a wedge shaped block 250, Fig. 8, which may be moved in and out by means of a headed screw 251 held from axial movement on the wedge and threaded into the carrier base plate. By turning the screw 251 the top lift will be placed in a position nearer to or farther away from the heel beneath without altering its transverse position, and the amount of compression for the particular top lift may be varied without varying the stroke of the cross head or the position of the same.

As well known by those skilled in the art the heel and top lifts are placed in position for attachment to the shoe, usually by an attendant at the rear of the machine, and it is essential to safety that the automatic operations of the machine be not started while the attendant is thus placing the heel and top lift in position. To this end, Fig. 14, there is pivoted at 252 a safety treadle 253 projecting to the rear of the machine in convenient position for the attendant at that point to depress the same. The upper portion 254 of this treadle is provided with an adjusting screw 255, the end of which is adapted to contact with a toe 256 secured to or projecting from the stop 168, which, as before described, is pivoted at 167 and, when withdrawn from the position shown in Fig. 14, permits the members of the clutch to become engaged. It will be noted from Fig. 14 that upon depression of the safety treadle 253 the end of the adjusting screw 255 will bear upon the toe 256 and prevent the operator at the front of the machine from starting the automatic operations by the knee lever 175.

After the top lift has been secured to the heel, the parts should all be returned to their initial positions for receiving a new shoe, and if convenient to automatically move the jack forward from the counter clamps into shoe removing and receiving position. One form of preferred mechanism used to accomplish these objects will now be described.

Having reference to Figs. 9 and 11, the rock shaft 84, through which the swinging shoe support or table was moved laterally to the right or left, and the forepart gages likewise positioned, and the counter clamps controlled as to their operative relation with the shoe, has secured thereon, Fig. 11, an arm 257 provided with a roll 258, said shaft 84, arm 257 and roll 258 being embraced by a recess 259 in a link 260 secured to or forming part of a bunter carriage 261, Fig. 11. The slot 259 in the link 260 is so formed that when the bunter carriage and link 260 are in their back position, as illustrated in Fig. 11, the shaft 84 can be rocked so as to carry the arm 257 upward or downward, and when the link 260 is moved forward it is evident that the roll 258 will be engaged by the wall 262 or 263 according as the rock shaft has been positioned for a right or left shoe adjustment, and said rock shaft will be turned into its central position to thereby swing the shoe supporting table back to initial position, return the forepart gages to their central or initial position, and to unclamp the counter clamps. In order that these correct positions shall be taken by the parts mentioned, even though some back lash or lost motion may be present, the slot 259 on the link 260 is preferably waved or made somewhat irregular as at 264 so that as the roll 258 passes into the linked part of the slot 259 the swinging table, the forepart gages and the counter clamps will be given a slight extra movement.

The bunter carriage 261 carries a spring actuated bunter 265, Fig. 11, which is adapted to engage a lug 266 extending from the jack supporting slide 25 when said bunter carriage is moved forward. It will be noted that the spring 52 acting upon the jack slide and tending normally to pull the same into position beneath the nailing devices has its end 54 attached to a rod 267, Fig. 11, secured to the bunter carriage, so that as the bunter carriage moves forward and pushes the jack slide into shoe receiving and removing position, said spring 52 is slackened.

Movement is imparted to the bunter carriage 261 by means of a lever 268, Figs. 5 and 11, suitably connected to the bunter carriage at its upper end and pivoted at 269, Fig. 5, the depending end 270 of said lever 268 carrying a roll 271 for engaging a cam groove 272, Figs. 5 and 15, carried by the cam 273, said cam 273 being carried by a sleeve 274 and connected to the sleeve 206 to rotate therewith.

When the cross head 5 begins its up stroke, after the top lift has been secured to the heel, the lever 156, Figs. 4 and 5, is engaged by the cam 158 and moves to withdraw the locking pawls or fingers 151 from engagement with the measuring rack 137, so that said rack becomes free to be moved and is thereafter moved by power to original position. The cam 204, Figs. 5 and 15, about this time acts upon the lever 198 and moves it to unlock the measuring spindle support 197 so that it may move upward under the influence of the spring 210. About this time, also, the cam 166 on the sleeve 206, Figs. 2 and 15, reaches a position to engage the roll 165 on the lever 163, which, being connected to the rack actuating lever 138, causes the rack to be withdrawn to its initial position and turns the sleeve 131 in a direction to lower the jack spindle 27 as the cross head 5 rises. The bunter carriage lever 268 is also moved at this time by its actuating cam to start the bunter carriage forward slightly, thereby turning the arm 257, Fig. 11, either upward or downward, which rotates the rock shaft 84 in a direction to withdraw the counter clamps and forepart gage from their engagement with the shoe and to move the shoe support back to its center position. The withdrawal of the counter clamps is not accomplished, however, until after the cross head has ascended a slight distance away from the top lift to prevent the upwardly moving head drawing the shoe upward with it by suction on the heel. At the time the measuring rack locking pawls or pins are released by the actuating cam, the lock or clamp 196, Figs. 8 and 11, for the jack support slide is also unclamped so that further forward movement of the bunter carriage will act upon the now entirely free jack supporting slide and push it forward from between the heel clamps. As the cross head rises, the top lift carrier is moved outward from beneath the nail block and finally into its top lift receiving position, shown in Fig. 1. This position is not reached, however, until the cross head finally comes to rest. Before the cross head finally comes to rest it moves upward to the height attained by its stroke after the nailing operation and then moves downward slightly to its initial or starting position ready for the next heel attaching movement. Prior to its final downward movement, however, the cam 204 operates to move the lever 198 to a position to prevent downward movement of the jack spindle support 197, thus holding it in readiness for the next measuring operation. The locking lever 143, Fig. 2, for the rack actuating lever 138 is automatically thrown into position to lock the actuating lever 138 in its rear position by means of its spring 145, Fig. 16, and just before the machine comes to rest by the disengagement of the clutch members the bunter carriage is returned to its initial position, as shown in Fig. 11.

As hereinbefore noted, the present machine is adapted for the attachment of heels provided with nails which have been driven at an inclination to the tread surface of the heel. In order that the action of the nailing devices may not displace the heel upon the heel seat of the shoe, the present invention further contemplates means for automatically engaging and holding a heel from such displacement as the cross head descends in attaching the heel to the heel seat. One form of means to the above ends is illustrated in Figs. 9 and 17, wherein there is mounted in the cross head, to partake of the movement thereof and to slide transversely of the machine, a heel stop slide 275 suitably guided, as by complemental ways formed in the cross head 5. The slide 275 carries a wedge 276, the edge of which is preferably serrated or roughened, as at 277, said wedge being held from movement toward the back of the machine by a block 278, Figs. 9 and 17. The outer end of the slide 275 is provided with a slot 279, said outer end of the slide being guided by a suitable bracket 280 secured to the cross head, Fig. 9, and said slot 279 is engaged by a pin or roll 281 carried by an arm 282 pivoted at 283 to the cross head, Fig. 9.
Formed in the bracket 284 projecting from the side frame 1 of the machine is a cam 285 preferably of the contour shown by dotted lines in Fig. 9, and engaging said stationary cam 285 is a roll 286 carried by the lever 282. Connected at 287 to the lever or arm 282 is a spring 288, the other end of which is connected at 289 to the cross head, the normal tendency of said spring being to move the lever or arm 282 to the right, Fig. 9. The cam 285 carried by the stationary bracket 284 has its lower portion 290 inclined rapidly to the right, as indicated, so that on the descent of the cross head, carrying the lever or arm 282, said arm or lever will be free to swing to the right when the roll 286 thereof meets the inclined portion 290 of the cam, thereby permitting the spring 288 to assert itself and carry the wedge 276 into position so that its serrated edge will contact with the rear edge of a heel, the construction being such that regardless of the size of the heel the wedge 276 will contact with and hold the heel in place wherever it finds it, such action being permitted by the characteristic cam and spring actuation of the slide 275, as will be clearly understood.

The foregoing description has been made in connection with attaching heels to shoes supported upon a wooden last. It is sometimes desirable to remove the last from the shoe and place the shoe upon an iron anvil, and after the heel has been attached, relast the shoe for the trimming and finishing operations. When an iron anvil is used, as is well known by those skilled in the art, it is not necessary to measure the heel as such anvil is strong enough to sustain whatever added pressure may be placed upon the heel due to variations in height. Therefore when the present machine is used for nailing upon an iron anvil, to make the desired disconnection of the measuring devices it is only necessary to remove the jack supporting slide and the jack spindle 27 and put in the machine in place thereof a slide having upon it an iron anvil with the usual means for adjusting said anvil vertically with relation to its support to obtain the desired amount of compression, such, for instance, as shown in the United States patent to Raymond, 354,655, dated December 21, 1886. It may be noted also in this connection that as the variation in the thickness of soles is very slight the counter clamps may be maintained, if desired, in one invariable position with relation to the top surface of the anvil. The operation of the machine when using an iron anvil is similar in all respects when using a jack for supporting a shoe upon a wooden last with the exception of the functions ascribed to the measuring instrumentalities, which in the former case are inactive.

When the machine is at rest before commencing the series of operations heretofore described, the cross head is at its vertical position somewhat lower than the greatest height to which it is moved, and the drivers 20 are retracted. The driver actuating rod is inactive, the jack slide actuating spring is under tension with the jack at the front of the machine and the swinging table or work support is at its central position and the shoe holding and gaging devices are in inoperative position.

A loaded heel is inserted by the attendant in position beneath the nail block by passing the projecting heads of its nails through the holes of the nail block, which has been previously selected so that its horseshoe of nails correspond to the number of nails in the heel to be treated. Also a top lift is placed by the attendant within the holding devices on the top lift carrier 233. A shoe, for the purposes of this description, assume a right one, is placed in position on the jack.

The lock 49 for holding the jack in its forward position is released and the jack moves back between the counter clamps in response to the spring 52. If not previously adjusted the positioning slide is adjusted through the hand lever 113 for the desired pitch of the heel, the vertical position of the counter clamps and forepart gages, as well as the relation of the axis of the swinging table to the rear of the top lift, is adjusted by the means hereinbefore noted, this and other adjustments of the shoe support bringing the parts into relation for treatment of the shoe.

Before the treadle 82 is depressed, the hand wheel 134 is moved in the proper direction to place the heel seat of the shoe such a distance below the heel that, in measuring, the jack spindle is elevated approximately one inch or a little more, the connecting parts being so proportioned that this amount of elevation is obtained through an easy and natural depression of the treadle. The left treadle 82 is now depressed and through the connections described the swinging table 22 is turned about its axis in a direction to move the forepart of the shoe to the left and the left forepart gage toward the center of the machine, the operator, as the shoe swings, pressing it toward the left to meet the forepart gage. During the latter part of this treadle depression the counter clamps are closed, the measuring mechanism actuating lever 138 is unlocked and the heel is measured.

If the heel has been properly measured, the roll 183 on the rack actuating lever 138 will have lifted the lever 181, Fig. 2, into central position with respect to the shoulders 178, 179 on the link 173 and the automatic operations of the machine will be in order. But should the measuring have been either too much or too little, the lever 181 will lock the arm or link 173 from movement so that the machine cannot be started. Assuming that the measuring has been properly done, the knee lever 175 is then pressed by the operator, thereby turning the shaft 172 and withdrawing the catch 168 to allow the clutch members to engage and transmit motion to the driving shaft.

As described, in the illustrative embodiment of the invention, four revolutions of the driving shaft are required to reciprocate the cross head 5 twice in order to attach the heel and spank on the top lift. It is obvious that with a one revolution type of clutch, as is preferably used, unless the operator keeps the treadle continuously depressed during the first three revolutions the machine will stop at the completion of each one of them. At the completion of the first revolution of the driving shaft, the heel has been attached and the cross head 5 has been raised through a portion of its succeeding stroke. During the operation upon the first shoe it is convenient to allow the clutch to stop the machine at the end of one rotation of the driving shaft so that the attached heel may be inspected, and, if desirable, adjustment made of some parts of the machine. At the completion of the second revolution of the driving shaft the cross head has been raised to its highest position and the top lift carrier has been moved inward and placed in operative position beneath the nail block. It is convenient also to have the machine stopped at the end of this revolution so that the proper adjustment of the top lift relative to the shoe and heel may be made. It may be that the operator will want at this time also to adjust the shoe positioning devices.

The top lift is spanked on during the third revolution of the driving shaft and as this completes the operations upon the shoe there is no necessity of further stoppage of the machine until the parts have assumed their initial positions in readiness to receive a new shoe at the end of the fourth revolution. It is therefore desirable that means be provided to prevent stoppage of the machine between the third and fourth revolutions should the operator remove his foot from the treadle. To this end the counter-shaft 11 is provided with a tappet 291, Fig. 14, which during the period of the third revolution bears upon the curved surface of the toe 256 connected to the stop member 168 so that even though the operator relieves the knee lever 175, the stop member 168 will be held from engagement with the stop 169 and consequently the machine will continue in operation.

It may be that the operator would desire to start the machine without operation of the shoe support and adjusting means for the shoe and without operating the measuring devices. To this end there is pivoted at 292, Fig. 14, a hand lever 293, the lower end of which at 294 engages a projection 295 on the link 170, there being a lost motion 296 between the link and its pivotal connection with the arm 171 which is connected to the knee lever 175, so that upon manipulation of the hand lever 293 the stop member 168 may be withdrawn from the stop 169 and the machine operated by power, as desired.

What is claimed is:

1. In a heeling machine, the combination, with a driving shaft a shoe support and heel nailing means, of means acting on and for swinging the shoe support laterally to change its angular position with relation to the nailing means, means for engaging the shoe as it is swung to limit the lateral movement thereof, and means actuated from the said driving shaft to operate the nailing devices and return the shoe support to central position after the nailing operation.

2. In a heel nailing machine, the combination, with a support for the heel seat of a shoe and means for attaching a heel to said seat, of a top-lift carrier, means for placing said carrier into alinement with the heel, and an adjustable wedge on the carrier for moving the top-lift in its carrier toward and from the tread face of the heel to determine the degree of penetration of the heel nails into the substance of the top-lift.

3. In a heel nailing machine, the combination of heel measuring mechanism under control of the operator for measuring the heel, automatically operating heel attaching mechanism, means for setting said mechanisms in operation, and connecting devices between said means constructed and arranged to prevent operation of the heel attaching mechanism actuating means until after the heel has been measured.

4. In a heel nailing machine, heel attaching mechanism, means for operating the same, devices for starting said means into operation, said devices being normally locked against movement in a direction to operate said mechanism, heel measuring mechanism, and means controlled by the heel measuring mechanism to unlock the said devices and permit operation of the heel attaching operating means.

5. In a heeling machine, heel and top lift attaching mechanism including a reciprocatory cross-head and a work support co-operating therewith, means for imparting to said cross-head a series of reciprocations relative to the work support to attach a heel and top lift, means for controlling said series of reciprocations constructed and arranged to stop movement of the cross-head at the ends of regular periods during its series of reciprocations, and means to prevent such stoppage of cross-head movement at the end of a selected period.

6. In a heel nailing machine, the combination of heel attaching mechanism, a shoe support, means for raising the shoe support to measure the heel, means for operating the heel attaching mechanism, and means to prevent operation of the heel attaching means when the heel has been improperly measured.

7. In a heel attaching machine, the combination of a cross-head and heel attaching means carried thereby, a work support, means under control of the operator for moving the work support to measure the heel, and means controlled by the measuring means for preventing operation of the heel attaching means when the heel has been improperly measured.

8. In a heeling machine, the combination of heel nailing mechanism, means for operating said mechanism, a work support, treadle operated means for moving the work support toward the heel nailing means to measure the heel, and a lock to prevent operation of the heel nailing means when the heel has been improperly measured.

9. In a heeling machine, the combination of heel nailing mechanism, actuating means therefor, a starting lever for starting said means into operation, a work support, treadle operated means for moving the work support toward the heel nailing means to measure the heel, and means to prevent movement of the starting lever to start the machine when the heel has been improperly measured.

10. In a heel nailing machine, the combination, with a shoe support, of a reciprocatory cross-head adapted to compress the heel, means for reciprocating the cross-head nail driving devices sustained by the cross-head, and means for operating said nail driving devices independent of cross-head movement.

11. In a heel nailing machine, the combination, with a shoe support and a reciprocatory cross-head, of a nail block rigidly sustained in said cross-head, nail drivers carried by the cross-head, and means to reciprocate said drivers through said nail block independent of cross-head movement.

12. In a machine of the class described, the combination, with a cross head and nail block sustained thereby and having obliquely arranged nail passages, of a plunger mounted in said cross-head to operate in the line of direction of the oblique nail passages, nail drivers carried by said plunger for entering the oblique nail passages, and means to reciprocate said plunger within the cross-head toward and from the nail block.

13. In a machine of the class described, the combination, with a work support, of a reciprocatory cross-head and nail driving devices movably mounted therein, and provisions for moving said cross-head and driving devices in unison for a time and thereafter moving said driving devices relatively to said cross-head and toward the nail block in driving the nails.

14. In a heel nailing machine, the combination, with a shoe support, a cross-head movable toward and from said support and a nail block on the cross-head, of a work carrier movably mounted on said cross-head and normally in inoperative position presenting its work supporting face to the rear of the machne, means to reciprocate said cross-head and means to hold the work carrier in work receiving position and movable during said reciprocation and independent of cross-head movement to move the work carrier into operative position beneath the nail block and cross-head.

15. In a heel nailing machine, the combination, with a cross-head and a nail block carried by the cross-head, of a work carrier normally at one side of said cross-head, power operated automatic means acting independent of cross-head movement to move said carrier into position adjacent the operating face of said cross-head and beneath the nail block, and means for reciprocating the cross-head.

16. In a heel nailing machine, the combination of a cross-head, a work support adapted to be positioned beneath the cross-head, means for reciprocating the cross-head, heel nailing means carried by the cross-head, and means on the cross-head movable into contact with the edge surface of the heel during movement of the cross-head to prevent displacement of the heel during the heel nailing operation.

17. In a heel nailing machine, the combination of a cross-head, a work support, means for reciprocating said cross-head toward and from the work support, a nail block carried by the cross-head and adapted to sustain a heel, a wedge carried by the cross-head, and means operative on downward movement of the cross-head for yieldingly moving the wedge into contact with the rear surface of the heel to hold the latter against displacement during the heel nailing operation.

18. In a heel nailing machine, the combination of a cross-head, a work support, means for moving the cross-head toward and from the work support, a nail block carried by the cross-head and having oblique perforations for the nail driving devices, a wedge carried by the cross-head, and means for moving the wedge into contact with the heel to prevent displacement of the heel during the heel attaching operation.

19. In a heeling machine, the combination of a cross-head and work support, heel attaching means, a heel holding wedge carried by the cross-head, a cam for moving the wedge in one direction, and a spring for moving it in the opposite direction.

20. In a heel nailing machine, the combination, of a cross-head and means for operating it, a shoe support, a nail block carried by the cross-head and adapted to support the heel, and wedging means carried by the cross-head and movable transversely thereof into position against the rear part of the heel as the cross-head is operated to hold the heel from displacement during the heel attaching operation.

21. In a heel nailing machine, the combination of heel nailing devices, means for operating said devices, a shoe support, means for swinging the shoe with relation to said nailing devices, right and left treadles for so moving the shoe, means to prevent simultaneous operation of both treadles, and devices actuated by the nailing operating means for returning the shoe to central position after the nailing operation.

22. In a heel nailing machine, the combination, with a cross-head, of heel nailing means and means for operating the same, a work support, a work supporting spindle, means tending normally to raise the spindle and work support, said means yielding under the downward action of the heel nailing means, and a lock for holding the work supporting spindle and work support in lowered position on the subsequent upward movement of the nailing devices.

23. In a heel nailing machine, the combination, with a cross-head, of heel nailing means and means for operating the same, a work support, a work supporting spindle, means tending normally to raise the spindle and work support, said means yielding under the downward action of the heel nailing means, a lock for holding the work supporting spindle and work support in lowered position on the subsequent upward movement of the nailing devices, and means for tripping said lock to permit the upward movement of the work support and spindle at the conclusion of the nailing operation.

24. In a heeling machine, the combination of a work support, a cross-head, heel nailing means carried by the cross-head, and means for reciprocating the cross-head, yielding means for operating the heel nailing means to permit the heel nailing means to remain inoperative during the descent of the cross-head and to thereafter be operated to perform the heel nailing operation.

25. In a machine of the class described, the combination of a cross-head and a shoe support, a plunger diagonally mounted in the cross-head and carrying a series of drivers, a nail block carried by the cross-head and having a series of oblique perforations for the passage of the drivers, an arm 222 for reciprocating the plunger obliquely in the cross-head, means for operating the cross-head, and operating means for the arm 222 to permit said arm to remain inactive during the descent of the cross-head and to thereafter be moved to reciprocate the plunger.

26. In a heeling machine, the combination of a cross-head and heel nailing means, a shoe support, power operated means for operating the cross-head and nailing means, a starting lever at the front of the machine for starting the operation of said power means, and a safety treadle extending to the rear of the machine and preventing the operation of the starting treadle during the positioning of the heel and top lift.

27. In a heel nailing machine, heel and top lift attaching mechanism including a reciprocatory cross-head and a work support coöperating therewith, means for imparting to said cross-head four reciprocations relative to the work support to attach a heel and top lift, means permitting the movement of the cross-head to be stopped at the ends of the first and second movements of the cross-head, and means to prevent such stoppage of the cross-head movement at the end of the third movement.

28. In a heeling machine, the combination of a cross-head, heel nailing means mounted on and diagonally disposed with reference to the path of movement of the cross-head, shoe supporting means, means to engage the heel of a shoe supported by the nailing means to prevent displacement of the heel during the attaching operation, and means operating independently of cross head movement to move the nailing means toward and from the shoe supporting means.

29. In a heeling machine, the combination of a cross-head, a shoe support below the cross-head, actuating means for the cross-head, heeling means movable with the cross-head and diagonally arranged with reference to the path of movement of the cross-head, and means independent of the cross-head actuating means for operating the heeling means independent of the cross-head.

30. In a heeling machine, the combination of heel and toplift attaching mechanism including a cross-head and work support, means for imparting to the cross-head and work support movements of relative approach and separation to attach a heel and toplift, means permitting such relative movements to be stopped at the end of the first and second of such relative movements, and means to prevent such stoppage at the end of the third movement.

31. In a heeling machine, the combination of heel and toplift attaching mechanism including a cross-head and work support, means for imparting to the cross-head and work support movements of relative approach and separation to attach a heel and toplift, means permitting such relative movements to be stopped at the end of the first and second of such relative movements, and a tappet and coacting member to prevent such stoppage at the end of the third movement.

32. In a heeling machine, the combination of a shoe support and heel nailing mechanism, means for swinging the shoe support laterally to position a shoe for the action of the heel nailing mechanism, a side gage movable to operative position to determine the lateral swing of the shoe, means for causing relative approach of the shoe support and heel nailing mechanism, and devices permitting the operation of the said last named means without actuation of the shoe positioning means.

33. In a heeling machine, the combination of a shoe support and heel nailing mechanism, power operated means for causing relative approach of the shoe support and nailing mechanism, a starting lever for starting the operation of said power means, and a rearwardly extending safety treadle preventing the said power means from being started by the starting lever until after the safety treadle has been operated.

34. In a heeling machine, the combination of a shoe support, a cross-head, a toplift holder pivotally supported at the rear of said cross-head, means for reciprocating the cross-head and toplift holder toward and from the shoe support, and means operative during the movement of the cross-head to swing the toplift holder downward and then beneath the cross-head as the latter rises from the shoe support.

35. In a heeling machine, the combination of a shoe support, a cross-head, a toplift holder pivotally supported at the rear of said cross-head, means for reciprocating the cross-head and toplift holder toward and from the shoe support, and cam actuated lever means operative during the movement of the cross-head to swing the toplift holder downward and then beneath the cross-head as the latter rises from the shoe support.

36. In a heeling machine, the combination of a work support for sustaining the shoe to be heeled, a work supporting spindle, means normally acting to raise said spindle and work support, a lock for holding the work support in raised position, means for tripping the lock, a cross-head, heeling devices carried thereby and adapted to depress the work support as the cross-head descends, and means for adjusting the amount of downward movement permitted the work support against its normally acting means responsive to cross-head movement.

37. In a heeling machine, the combination of a work support for sustaining the shoe to be heeled, a work supporting spindle, means normally acting to raise said spindle and work support, a lock for holding the work support in raised position, means for tripping the lock, a cross-head, heeling devices carried thereby and adapted to depress the work support as the cross-head descends, means for adjusting the amount of downward movement permitted the work support against its normally acting means responsive to cross-head movement, and a lock for holding said means in adjusted position.

38. In a heeling machine, the combination of a work support for sustaining the shoe, a work supporting spindle, a spring 210 acting on said spindle to normally raise the work support, a collared sleeve 211 adjustably mounted on said spindle, a guide 214, a cross-head having heeling mechanism mounted thereon, and means to reciprocate the cross-head and depress the shoe support to the limit of movement determined by the collared sleeve and guide.

39. In a heeling machine, the combination of heeling mechanism, actuating means therefor, starting devices for starting said means into operation, a work support, means for moving the work support toward the heeling mechanism to measure the heel, a measuring indicating lever, and means coacting therewith to prevent operation of the starting devices when the heel is not properly measured.

40. In a heeling machine of the character described, the combination of a work support, a cross-head, means for reciprocating the cross-head toward and from the work support, nailing devices, a lever on the cross-head for actuating said devices, a cam actuated rod, and an actuating rod connected to the said lever on the cross-head and having free limited telescopic relation with said cam actuated rod for operating the nailing devices independent of cross-head movement.

41. In a heeling machine of the character described, the combination of a work support, a cross-head, means for reciprocating the cross-head toward and from the work support, nailing devices movable in a plane oblique to the cross-head, a lever on the cross-head for actuating said devices, a cam actuated rod, and an actuating rod connected to the said lever on the cross-head and having free limited telescopic relation with said cam actuated rod for operating the nailing devices independent of cross-head movement.

42. In a heeling machine, the combination of a work support, a cross-head, means for reciprocating the cross-head toward and from the work support, nailing devices, a lever pivotally mounted on the cross-head for operating said nailing devices, an actuating rod 216, a sleeve 219 to which said rod is connected, a rod 220 jointed to the lever on the cross-head and telescoping into the sleeve 219, and means for actuating the rod 216.

43. In a heeling machine, a work support for sustaining the work, a cross-head, means for reciprocating the cross-head toward and from the work support, a toplift holder pivotally mounted at the rear of the cross-head, an actuating rod 236 connected to the toplift holder, a cam actuated lever 243, and connections between said rod and lever to move the toplift carrier to and from operative position beneath the cross-head.

In testimony whereof, I have signed my name to this specification, in the presence of two subscribing witnesses.

THOMAS G. PLANT.

Witnesses:
  AMELIA M. ROSS,
  S. R. BLAKELY.